US009382394B2

(12) United States Patent
Ker et al.

(10) Patent No.: US 9,382,394 B2
(45) Date of Patent: Jul. 5, 2016

(54) ETHYLENE COPOLYMERS, FILM AND POLYMERIZATION PROCESS

(71) Applicant: NOVA Chemicals (International) S.A., Fribourg (CH)

(72) Inventors: Victoria Ker, Calgary (CA); Patrick Lam, Calgary (CA); Yan Jiang, Calgary (CA); Peter Phung Minh Hoang, Calgary (CA); Darryl J. Morrison, Calgary (CA); Charles Ashton Garret Carter, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/718,604

(22) Filed: May 21, 2015

(65) Prior Publication Data

US 2015/0252159 A1    Sep. 10, 2015

Related U.S. Application Data

(62) Division of application No. 13/918,506, filed on Jun. 14, 2013, now Pat. No. 9,079,991.

(30) Foreign Application Priority Data

Jun. 21, 2012 (CA) .................. 2780508
Dec. 14, 2012 (CA) .................. 2798855

(51) Int. Cl.
*B32B 27/32* (2006.01)
*C08F 210/16* (2006.01)
*C08F 4/6592* (2006.01)
*C08J 5/18* (2006.01)
*C08F 4/659* (2006.01)

(52) U.S. Cl.
CPC . *C08J 5/18* (2013.01); *B32B 27/32* (2013.01); *C08F 4/6592* (2013.01); *C08F 210/16* (2013.01); *C08F 4/65916* (2013.01); *C08F 2410/01* (2013.01); *C08F 2410/02* (2013.01); *C08F 2420/04* (2013.01); *C08J 2323/08* (2013.01)

(58) Field of Classification Search
CPC ...... B32B 27/32; C08F 210/16; C08F 4/6592
See application file for complete search history.

(56) References Cited

U.S. PATENT DOCUMENTS

| 3,248,179 A | 4/1966 | Norwood |
| 4,325,849 A | 4/1982 | Rosen et al. |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,701,432 A | 10/1987 | Welborn, Jr. |
| 4,808,561 A | 2/1989 | Welborn, Jr. |
| 4,935,397 A | 6/1990 | Chang |
| 4,937,301 A | 6/1990 | Chang |
| 5,026,795 A | 6/1991 | Hogan |
| 5,028,670 A | 7/1991 | Chinh et al. |
| 5,057,475 A | 10/1991 | Canich et al. |
| 5,064,802 A | 11/1991 | Stevens et al. |
| 5,096,867 A | 3/1992 | Canich et al. |
| 5,132,380 A | 7/1992 | Stevens et al. |
| 5,206,075 A | 4/1993 | Hodgson, Jr. |
| 5,281,679 A | 1/1994 | Jejelowo et al. |
| 5,283,278 A | 2/1994 | Daire et al. |
| 5,317,036 A | 5/1994 | Brady, III et al. |
| 5,324,800 A | 6/1994 | Welborn, Jr. |
| 5,352,749 A | 10/1994 | DeChellis et al. |
| 5,382,630 A | 1/1995 | Stehling et al. |
| 5,382,631 A | 1/1995 | Stehling et al. |
| 5,405,922 A | 4/1995 | DeChellis et al. |
| 5,420,220 A | 5/1995 | Cheruvu et al. |
| 5,436,304 A | 7/1995 | Griffin et al. |
| 5,453,471 A | 9/1995 | Bernier et al. |
| 5,462,999 A | 10/1995 | Griffin et al. |
| 5,487,938 A | 1/1996 | Spencer et al. |
| 5,525,689 A | 6/1996 | Tsutsui et al. |
| 5,616,661 A | 4/1997 | Eisinger et al. |
| 5,633,394 A | 5/1997 | Welborn, Jr. |
| 5,668,228 A | 9/1997 | Chinh et al. |
| 5,684,097 A | 11/1997 | Palmroos et al. |
| 5,703,187 A | 12/1997 | Timmers |
| 5,874,513 A | 2/1999 | Watanabe et al. |
| 5,965,677 A | 10/1999 | Stephan et al. |
| 6,002,033 A | 12/1999 | Razavi et al. |
| 6,022,935 A | 2/2000 | Fischer et al. |
| 6,034,021 A | 3/2000 | Wilson et al. |
| 6,248,845 B1 | 6/2001 | Loveday et al. |

(Continued)

FOREIGN PATENT DOCUMENTS

| CA | 2277259 C | 1/2001 |
| CA | 2454521 A1 | 1/2003 |

(Continued)

OTHER PUBLICATIONS

Pangborn et al, Safe and convenient procedure for solvent purification, Organometallics, 1996, v15, pp. 1518-1520.
Wild et al, Determination of branching distributions in polyethylene and ethylene copolymers, J. Poly. Sci., Poly. Phys. Ed., 1982, vol. 20, pp. 441-455.
Coulter et al, Adv. in Polyole. II, Napa, Cal., Oct. 24-27, 1999, Develop. of NOVA's Single Site Cat. Tech. for use in the Gas Phase Process, slide printout 27 pages.
Spence et al, Cycyopentadienyl Phosphinimine Titanium Catalysts, 2002 CA Soc. for Chem. Conference, NOVA Research and Technology Center, Slide printout, 28 pages.
Peri et al, The Surface Structure of Silica Gel, J. Phys. Chem., 72 (8), 1968, pp. 2926-2933.

(Continued)

*Primary Examiner* — Caixia Lu
(74) *Attorney, Agent, or Firm* — Julie L. Heinrich

(57) ABSTRACT

Ethylene copolymers having a relatively high melt flow ratio and a multimodal profile in a temperature rising elution fractionation (TREF) plot are disclosed. The copolymers can be made into film having good dart impact values and good stiffness properties under decreased extruder pressures.

7 Claims, 8 Drawing Sheets

(56) References Cited

U.S. PATENT DOCUMENTS

| | | |
|---|---|---|
| 6,255,426 B1 | 7/2001 | Lue et al. |
| 6,300,436 B1 | 10/2001 | Agapiou et al. |
| 6,306,984 B1 | 10/2001 | Agapiou et al. |
| 6,319,989 B1 | 11/2001 | Anderson et al. |
| 6,339,134 B1 | 1/2002 | Crowther et al. |
| 6,384,158 B1 | 5/2002 | Bamberger et al. |
| 6,388,115 B1 | 5/2002 | Crowther et al. |
| 6,391,819 B1 | 5/2002 | Agapiou et al. |
| 6,399,535 B1 | 6/2002 | Shih |
| 6,420,507 B1 | 7/2002 | Kale et al. |
| 6,441,116 B1 | 8/2002 | Shikuma et al. |
| 6,462,161 B1 | 10/2002 | Cady et al. |
| 6,469,103 B1 | 10/2002 | Jain et al. |
| 6,472,342 B2 | 10/2002 | Agapiou et al. |
| 6,476,171 B1 | 11/2002 | Lue et al. |
| 6,489,413 B1 | 12/2002 | Floyd et al. |
| 6,528,597 B2 | 3/2003 | Loveday et al. |
| 6,559,090 B1 | 5/2003 | Shih |
| 6,562,924 B2 | 5/2003 | Benazouzz et al. |
| 6,608,153 B2 | 8/2003 | Agapiou et al. |
| 6,642,340 B1 | 11/2003 | Takahashi et al. |
| 6,686,306 B2 | 2/2004 | Shih |
| 6,734,131 B2 | 5/2004 | Shih |
| 6,828,394 B2 | 12/2004 | Vaughan et al. |
| 6,932,592 B2 | 8/2005 | Farley et al. |
| 6,936,675 B2 | 8/2005 | Szul et al. |
| 6,956,088 B2 | 10/2005 | Farley et al. |
| 6,958,375 B2 | 10/2005 | Shih |
| 7,018,710 B2 | 3/2006 | Kallio et al. |
| 7,141,632 B2 | 11/2006 | Vaughan et al. |
| 7,172,816 B2 | 2/2007 | Szul et al. |
| 7,179,876 B2 | 2/2007 | Szul et al. |
| 7,354,880 B2 | 4/2008 | Agapiou et al. |
| 7,381,783 B2 | 6/2008 | Loveday et al. |
| 7,476,715 B2 | 1/2009 | McKay et al. |
| 7,521,518 B2 | 4/2009 | Jacobsen et al. |
| 7,534,847 B2 | 5/2009 | Mihan et al. |
| 7,875,690 B2 | 1/2011 | Graham et al. |
| 8,084,560 B2 | 12/2011 | Kolb et al. |
| 8,114,946 B2 | 2/2012 | Yang et al. |
| 2006/0122054 A1 | 6/2006 | Hoang et al. |
| 2008/0045406 A1 | 2/2008 | McKay et al. |
| 2008/0108768 A1 | 5/2008 | Loveday et al. |
| 2011/0003099 A1 | 1/2011 | Vinck |
| 2011/0040041 A1 | 2/2011 | Kolb et al. |
| 2011/0184124 A1 | 7/2011 | Stakem et al. |
| 2011/0212315 A1 | 9/2011 | Faninel et al. |
| 2012/0141710 A1 | 6/2012 | Yang et al. |

FOREIGN PATENT DOCUMENTS

| | | |
|---|---|---|
| CA | 2716772 A1 | 4/2011 |
| CA | 2734167 A1 | 9/2012 |
| CA | 2742454 A1 | 12/2012 |
| CA | 2742461 A1 | 12/2012 |
| EP | 107127 A1 | 5/1984 |
| WO | 93/03093 A1 | 2/1993 |

OTHER PUBLICATIONS

Hieber et al, Some correlations involving the shear viscosity of polyetyrene melts, Rheol. Acta, 1996, v15, p. 1511-1520.

Clark et al, Supported catalysts, published online Nov. 15, 2002, Kirk-Othmer Encyclopedia of Chemical Technology, John Wiley & Sons, Inc., pp. 1-37.

Brunauer et al, Adsorption of gases in multimolecular layers, Journal of the American Chemical Society, Feb. 1938, v60, pp. 309-319.

Hieber et al, Shear-rate-dependence modeling of polymer melt viscosity, Polym. Eng. Sci., vol. 32, No. 14 Jul. 1992, pp. 931-938.

Bird et al, Dynamics of polymer liquids, The generalized newtonian fluid, 2nd, vol. 1, Chapter 4, 1987, pp. 169-175.

ASTM F88/F88M-09; Standard test method for seal strength of flexible barrier materials, Jul. 2009, pp. 1-11.

ASTM D 1003-07; Standard test method for haze and luminous transmittance of transparent plastics, Nov. 2007, pp. 1-7.

ASTM D 882-10; Standard test method for tensile properties of thin plastic sheeting, Jun. 2010, pp. 1-10.

ASTM D 1238-10; Standard test method for melt flow rates of thermoplastics by extrusion plastometer, Mar. 2010, pp. 1-15.

ASTM D 1709-04; Standard test methods for impact resistance of plastic film by the free-falling dart method, Oct. 2004, pp. 1-9.

ASTM D 1922-03a; Standard test method for propagation tear resistance of plastic film and thin sheeting by pendulum method, Jan. 2004, pp. 1-6.

ASTM D 1928-96; Standard practice for preparation of compression-molded polyethylene test sheets and test specimens, Sep. 1996, pp. 1-7.

ASTM D 2457-03; Standard test method for Specular gross of plastic film and solid plastics, Oct. 2003, pp. 1-5.

ASTM D 5227-01; Standard test method for measurements of hexane extractable content of polyolefins, Mar. 2009, pp. 1-4.

ASTM D 5478-13; Standard test method for viscosity of materials by a falling needle viscometer, Feb. 2013, pp. 1-5.

ASTM D 6474-99; Standard test method for determining mole. wt. distribution and mole. st. averages of polyolefins by high temp. gel permeation chromatography, Feb. 2000, pp. 1-6.

US 9,382,394 B2

ETHYLENE COPOLYMERS, FILM AND POLYMERIZATION PROCESS

REFERENCE TO RELATED APPLICATION

This application is a divisional of U.S. Ser. No. 13/918,506, filed Jun. 14, 2013, which is entitled "Ethylene Copolymers, Film and Polymerization Process" which is herein incorporated by reference in its entirety.

FIELD OF THE INVENTION

The present invention is directed to the preparation of polyethylene copolymers, the films made from them as well as a polyethylene polymerization process. A phosphinimine type catalyst is employed to make ethylene copolymers having a relatively high melt flow ratio ($I_{21}/I_2$) and a multimodal TREF profile. The ethylene copolymers have a composition distribution breadth index $CDBI_{50}$ of between 35 wt % and 70 wt % and can be made into film with good physical properties while exhibiting enhanced processability.

BACKGROUND OF THE INVENTION

The search for polyethylene products having an improved balance of physical properties and processability has led to the development of products having improved output capacity and ever improving end use properties such as enhanced film tear or dart impact properties. Particularly useful is the development of polymer architectures for which polymer blending strategies can be avoided for enhancement of polymer properties, since these strategies increase cost.

U.S. Pat. Appl. No. 2011/0003099 discusses low melt flow ratio (MFR) linear polyethylene and high melt flow ratio (MFR) linear polyethylene, which are distinguished by an $I_{21}/I_2$ of less than 30 and an $I_{21}/I_2$ of greater than 30 respectively.

Resins having both a narrow molecular weight distribution and a low melt flow ratio are well known and include resins produced with metallocene catalysts and phosphinimine catalysts. Such resins include for example Exceed 1018A™ from ExxonMobil and those described in U.S. Pat. No. 5,420,220 and Canadian Pat. Appl. No. 2,734,167. These resins can be made into films having a good balance of physical and optical properties, but can be difficult to process in the absence of processing aids, as indicated by, for example, a relatively low output capacity on a blown film line.

Resins having a higher melt flow ratio are more attractive to film producers because they are generally easier to process. U.S. Pat. Nos. 6,255,426 and 6,476,171 and U.S. Pat. Appl. No. 2011/0003099 each describe the production and use of resins having melt flow ratios which are in excess of 30 and which have moderately broad molecular weight distributions. The resins are thought to contain long chain branching. The polymers disclosed in U.S. Pat. Nos. 6,255,426 and 6,476, 171 are made with a bridged bis-indenyl zirconocene catalyst and have a composition distribution breadth index (CDBI) of greater than 75%. The resins have been referred to as Enable™ polymers (ExxonMobil) in the patent literature (see for example, the Example Polymers disclosed in U.S. Pat. Appl. No. 2011/0003099), and although the resins are relatively easy to process, they also have a good balance of strength and stiffness properties when blown into film. For example, the films had physical properties which were comparable to Exceed 1018A materials despite their better shear thinning behavior. The polymers disclosed in U.S. Pat. Appl. No. 2011/0003099, include a new "Enable" grade resin having a low melt index ($I_2$=0.3), a relatively high melt flow ratio ($I_{21}/I_2$ is from 46-58) and a moderately broad molecular weight distribution (e.g. $M_w/M_n$ is 3.4). The polymers also have a single peak in a TREF profile, with a T(75)-T(25) of less than 4° C.

Manipulation of the comonomer distribution profile has also provided novel ethylene copolymer architectures in an effort to improve the balance between physical properties and polymer processability.

It is generally the case that metallocene catalysts and other so called "single site catalysts" typically incorporate comonomer more evenly than traditional Ziegler-Natta catalysts when used for catalytic ethylene copolymerization with alpha olefins. This fact is often demonstrated by measuring the composition distribution breadth index (CDBI) for corresponding ethylene copolymers. The definition of composition distribution breadth index ($CDBI_{50}$) can be found in PCT publication WO 93/03093 and in U.S. Pat. No. 5,206,075. The $CDBI_{50}$ is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 can be employed. From the weight fraction versus composition distribution curve, the $CDBI_{50}$ is determined by establishing the weight percentage of a copolymer sample that has a comonomer content within 50% of the median comonomer content on each side of the median. Generally, Ziegler-Natta catalysts produce ethylene copolymers with a $CDBI_{50}$ lower than that of a single site catalyst at a similar density consistent with a heterogeneously branched copolymer. Typically, a plurality of prominent peaks is observed for such polymers in a TREF (temperature raising elution fractionation) analysis. Such peaks are consistent with the presence of heterogeneously branched material which generally includes a highly branched fraction, a medium branched fraction and a higher density fraction having little or no short chain branching. In contrast, metallocenes and other single site catalysts, will most often produce ethylene copolymers having a $CDBI_{50}$ higher than that of a Ziegler-Natta catalyst at similar density and which often contain a single prominent peak in a TREF analysis, consistent with a homogeneously branched copolymer.

Despite the forgoing, methods have been developed to access polyethylene copolymer compositions having a broadened comonomer distribution (i.e. more Ziegler-Natta like) while otherwise maintaining product characteristics typical of metallocene and single site catalyst resin, such as high dart impact strength for blown film. Such resins can be made, for example, by using a mixture of metallocene catalysts in a single reactor, using a plurality of polymerization reactors under different polymerization conditions, or by blending metallocene produced ethylene copolymers.

U.S. Pat. Nos. 5,382,630, 5,382,631 and WO 93/03093 describe polyethylene copolymer blend compositions having broad or narrow molecular weight distributions, and broad or narrow comonomer distributions. For example a blend may have a narrow molecular weight distribution, while simultaneously having a bimodal composition distribution. Alternatively a blend may have a broad molecular weight distribution while simultaneously having a unimodal composition distribution. The blends are made by melt blending two polyethylene resins with similar or different molecular weights and similar or different comonomer contents, where each resin is formed using a metallocene catalyst in a gas phase reactor.

U.S. Pat. No. 7,018,710 discloses blends comprising a high molecular weight component having a high comonomer content and a low molecular weight component having a low comonomer content. The ethylene copolymer blend, which arises from the use of a metallocene catalyst in a cascade dual reactor process where each reactor is operated under different conditions (e.g. a cascade slurry phase-gas phase reactor), shows two distinct maxima in a TREF fractogram. The polymers were applied as a sealing layer in a heat sealable film.

A mixed catalyst system containing a "poor comonomer incorporator" and a "good comonomer incorporator" is disclosed in U.S. Pat. Nos. 6,828,394 and 7,141,632. The poor comonomer incorporating catalyst may be a metallocene having at least one fused ring cyclopentadienyl ligand, such as an indenyl ligand, with appropriate substitution (e.g. alkyl substitution at the 1-position). The good comonomer incorporating catalyst was selected from an array of well-known metallocenes and which was generally less sterically encumbered toward the front end of the molecule than the poor comonomer incorporator. These mixed catalyst systems produced polyethylene copolymers having a bimodal TREF distribution in which two elution peaks are well separated from one another, consistent with the presence of higher and lower density components. The mixed catalysts also produced ethylene copolymer having a broadened molecular weight distribution relative to ethylene copolymer made with either one of the single metallocene component catalysts.

A mixed catalyst system comprising three distinct metallocene catalysts is disclosed in U.S. Pat. No. 6,384,158. Ethylene copolymers having broadened molecular weight distributions were obtained when using these catalyst systems to polymerize ethylene with an alpha olefin such as 1-hexene.

U.S. Pat Appl. No. 2011/0212315 describes a linear ethylene copolymer having a bimodal or multimodal comonomer distribution profile as measured using DSC, TREF or CRYSTAF techniques. The copolymers maintain a high dart impact resistance when blown into film and are relatively easy to process as indicated by a reduced shear thinning index, relative to ethylene copolymers having a unimodal comonomer distribution profile. The exemplified ethylene copolymer compositions, which have a melt flow ratio of less than 30, are made in a single gas phase reactor by employing a mixed catalyst system comprising a metallocene catalyst and a late transition metal catalyst.

U.S. Pat. No. 7,534,847 demonstrates that use of a chromium based transition metal catalyst gives an ethylene copolymer having a bimodal comonomer distribution (as indicated by CRYSTAF) with a CDBI of less than 50 wt % (see Table 1 of U.S. Pat. No. 7,534,847). The patent teaches that the copolymers may have a molecular weight distribution of from 1 to 8, significant amounts of vinyl group unsaturation, long chain branching and specific amounts of methyl groups as measured by CRYSTAF fractionation.

U.S. Pat. No. 6,932,592 describes very low density (i.e. <0.916 g/cc) ethylene copolymers produced with a bulky non-bridged bis-Cp metallocene catalyst. A preferred metallocene is bis(1-methyl-3-n-butylcyclopentadienyl)zirconium dichloride. The examples show that in the gas phase, supported versions of this catalyst produce copolymer from ethylene and 1-hexene which has a CDBI of between 60 and 70% and a bimodal comonomer distribution as measured by temperature raising elution fractionation (TREF).

U.S. Pat. No. 6,420,507 describes a low density ethylene copolymer having a narrow molecular weight distribution (i.e. 1.5 to 3.0) and a bimodal TREF profile. The polymerization is carried out in the gas phase using a so called "constrained geometry" catalyst having an indenyl ligand.

U.S. Pat. Nos. 6,248,845, 6,528,597, 7,381,783 and U.S. Pat. Appl. No. 2008/0108768 disclose that a bulky ligand metallocene based on hafnium and a small amount of zirconium can be used to provide an ethylene/1-hexene copolymer which has a bimodal TREF profile. It is taught that the hafnium chloride precursor compounds used to synthesize the bulky metallocene catalysts are either contaminated with small amount of zirconium chloride or that zirconium chloride may be deliberately added. The amounts of zirconium chloride present range from 0.1 mol % to 5 mol %. Hence, the final hafnocene catalysts contain small amounts (i.e. 0.1 to 5 mol %) of their zirconocene analogues. Since zirconium based catalysts can have superior activity relative to their hafnium analogs it is possible that the products made have a significant contribution from the zirconocene species. If this is the case, then it is perhaps not surprising that a bimodal TREF profile results. The patent provides data for cast and blown film applications which shows that compared to Exceed type resins, the polymers are more easily extruded, with lower motor load, higher throughput and reduced head pressure. The resins give cast film with high tear values and blown film with high dart impact values.

U.S. Pat. Nos. 6,956,088, 6,936,675, 7,179,876 and 7,172,816 disclose that use of a "substantially single" bulky ligand hafnium catalyst provides an ethylene copolymer composition having a CDBI of below 55%, especially below 45% as determined by CRYSTAF. Recall, that hafnocene catalysts derived from hafnium chloride are expected to have zirconocene contaminants present in low amounts. U.S. Pat. Nos. 6,936,675 and 7,179,876 further teach that the CDBI could be changed under different temperature conditions when using hafnocene catalysts. Polymerization at lower temperatures gave ethylene copolymer having a broader composition distribution breadth index (CDBI) relative to polymers obtained at higher temperatures. For example, use of the catalysts bis(n-propylcyclopentadienyl)hafnium dichloride or bis(n-propylcyclopentadienyl)hafnium difluoride in a gas phase reactor for the copolymerization of ethylene and 1-hexene at ≤80° C., gave copolymers having a CDBI of between 20 and 35%, compared to CDBI values of between 40 and 50% for copolymers obtained at 85° C. The polymers disclosed can, under certain draw down ratios, provide films having a machine direction tear value of greater than 500 g/mil, a dart impact resistance of greater than 500 g/mil, as well as good stiffness. The polymers also have good processability.

U.S. Pat. No. 5,281,679 describes bis-cyclopentadienyl metallocene catalysts which have secondary or tertiary carbon substituents on a cylcopentadienyl ring. The catalysts provide polyethylene materials with broadened molecular weight during gas phase polymerization.

Cyclic bridged bulky ligand metallocene catalysts are described in U.S. Pat. Nos. 6,339,134 and 6,388,115 which give easier processing ethylene polymers.

A hafnocene catalyst is used in U.S. Pat. No. 7,875,690 to give an ethylene copolymer in a gas phase fluidlzed bed reactor. The copolymer has a so called "broad orthogonal composition distribution" which imparts improved physical properties and low extractables. A broad orthogonal composition distribution is one in which the comonomer is incorporated predominantly in the high molecular weight chains. The copolymers had a density of at least 0.927 g/cc. Polyethylene copolymers having a similarly broad orthogonal composition distribution but a lower density are disclosed in U.S. Pat. No. 8,084,560 and U.S. Pat. Appl. No. 2011/0040041A1. Again a hafnocene catalyst is employed in a gas phase reactor to give the ethylene copolymer.

U.S. Pat. No. 5,525,689 also discloses the use of a hafnium based metallocene catalyst for use in olefin polymerization.

The polymers had a ratio of $I_{10}/I_2$ of from 8 to 50, a density of from 0.85 to 0.92 g/cc, a Mw/Mn of up to 4.0, and were made in the gas phase.

U.S. Pat. No. 8,114,946 discloses ethylene copolymers which have a molecular weight distribution ($M_w/M_n$) ranging from 3.36 to 4.29, a reversed comonomer incorporation and contain low levels of long chain branching. The melt flow ratios of the disclosed polymers are generally below about 30. A bridged cyclopentadienyl/fluorenyl metallocene catalyst having an unsaturated pendant group is used to make the ethylene copolymers. The patent application does not mention films or film properties.

U.S. Pat. No. 6,469,103 discusses ethylene copolymer compositions comprising a first and a second ethylene copolymer component. The individual components are defined using ATREF-DV analytical methods which show a bimodal or multimodal structure with respect to comonomer placement. The compositions have an $I_{10}/I_2$ value of greater 6.6 and a relatively narrow molecular weight distribution (i.e. $M_w/M_n$ is less than or equal to 3.3) consistent with the presence of long chain branching. The polymers are made using a dual solution reactor system with mixed catalysts.

A process for making ethylene polymer compositions involving the use of at least two polymerization reactors is described in U.S. Pat. No. 6,319,989. The ethylene copolymers have a molecular weight distribution of greater than 4.0 and show two peaks when subjected to a crystallization analysis fractionation (CRYSTAF).

U.S. Pat. No. 6,462,161 describes the use of either a constrained geometry type catalyst or a bridged bis-Cp metallocene catalyst to produce, in a single reactor, a polyolefin composition having long chain branching and a molecular weight maximum occurring in the part of the composition having the highest comonomer content (i.e. a reversed comonomer distribution). The compositions made with a constrained geometry catalyst have multimodal TREF profiles, and relatively narrow molecular weight distributions (e.g. the exemplified resins have a $M_w/M_n$ of from 2.19 to 3.4, see Table 1 in the examples section of U.S. Pat. No. 6,462,161). The compositions made with a bridged bis-Cp metallocene catalyst have complex TREF profiles and somewhat broader molecular weight distribution (e.g. the exemplified reins have a $M_w/M_n$ of 3.43 or 6.0, see Table 1 in the Examples section of U.S. Pat. No. 6,462,161).

Ethylene copolymers are taught in U.S. Pat. No. 7,968,659 which have a melt index of from 1.0 to 2.5, a $M_w/M_n$ of from 3.5 to 4.5, a melt elastic modulus G'(G"=500 Pa) of from 40 to 150 Pa and an activation energy of flow (Ea) in the range of 28 to 45 kJ/mol. Constrained geometry catalysts are used to make the polymer compositions in the gas phase.

U.S. Pat. No. 7,521,518 describes the use of a constrained geometry catalyst to give an ethylene copolymer composition having a reversed comonomer distribution as determined by various cross fractionation chromatography (CFC) parameters and a molecular weight distribution of from 2 to 10.

U.S. Pat. No. 5,874,513 describes that the use of a mixture of components which give rise to a supported metallocene catalyst can, in a gas phase reactor, give an ethylene copolymer with reduced comonomer distribution homogeneity. The patent defines a composition distribution parameter Cb which is representative of the distribution of comonomers within the polymer composition. The TREF analysis of the copolymer composition showed a bimodal distribution.

U.S. Pat. No. 6,441,116 discloses a film comprising an ethylene copolymer with a composition distribution curve obtained by TREF having four distinct areas including one peak defining area which is attributed to a highly branched component.

An ethylene/alpha olefin copolymer produced with a Ziegler-Natta catalyst and having greater than about 17 weight percent of a high density fraction, as determined by analytical TREF methods, and a molecular weight distribution ($M_w/M_n$) of less than about 3.6 is disclosed in U.S. Pat. No. 5,487,938. The high density fraction has little short chain branching, while the balance of the copolymer composition is referred to as the fraction containing short chain branching. Hence, the data is consistent with a bimodal distribution of comonomer incorporation into the ethylene copolymer.

U.S. Pat. No. 6,642,340 describes an ethylene copolymer having a specific relationship between a melt flow rate and melt tension. The polymers further comprise between 0.5 and 8 wt % of a component eluting at not lower than 100° C. in a TREF analysis.

Use of phosphinimine catalysts for gas phase olefin polymerization is the subject matter of U.S. Pat. No. 5,965,677. The phosphinimine catalyst is an organometallic compound having a phosphinimine ligand, a cyclopentadienyl type ligand and two activatable ligands, and which is supported on a suitable particulate support such as silica. The exemplified catalysts had the formula $CpTi(N=P(tBu)_3)X_2$ where X was Cl, Me or Cl and —O-(2,6-iPr—$C_6H_3$).

In co-pending CA Pat. Appl. No. 2,734,167 we showed that suitably substituted phosphinimine catalysts gave narrow molecular weight distribution copolymers which when made into film showed a good balance of optical and physical properties.

Polymers and films made in the gas phase using various single site catalysts, including so called "phosphinimine" catalysts, were disclosed at Advances in Polyolefins II, Napa, California—Oct. 24-27, 1999 ("Development of NOVA's Single Site Catalyst Technology for use in the Gas Phase Process"—I. Coulter; D. Jeremic; A. Kazakov; I. McKay).

In a disclosure made at the 2002 Canadian Society for Chemistry Conference ("Cyclopentadienyl Phosphinimine Titanium Catalysts—Structure, Activity and Product Relationships in Heterogeneous Olefin Polymerization." R. P. Spence; I. McKay; C. Carter; L. Koch; D. Jeremic; J. Muir; A. Kazakov. NOVA Research and Technology Center, CIC, 2002), it was shown that phosphinimine catalysts bearing variously substituted cyclopentadienyl and indenyl ligands were active toward the gas phase polymerization of ethylene when in supported form.

U.S. Pat. Appl. No. 2008/0045406, discloses a supported phosphinimine catalyst comprising a $C_6F_5$ substituted indenyl ligand. The catalyst was activated with an ionic activator having an active proton for use in the polymerization of ethylene with 1-hexene.

U.S. Pat. Appl. No. 2006/0122054 discloses the use of a dual catalyst formulation one component of which is a phosphinimine catalyst having an n-butyl substituted indenyl ligand. The patent is directed to the formation of bimodal resins suitable for application in pipe.

SUMMARY OF THE INVENTION

We now report that a polymerization catalyst system comprising a single phosphinimine catalyst can provide an ethylene copolymer having a multimodal comonomer distribution profile and medium molecular weight distribution when used in a single reactor. The invention mitigates the need for polymer blends, mixed catalysts, or mixed reactor technologies in the formation of polyethylene resin which is easy to process and has a good balance of physical properties.

Provided is an olefin polymerization process to produce an ethylene copolymer, the process comprising contacting ethylene and at least one alpha olefin having from 3-8 carbon atoms with a polymerization catalyst system in a single reactor; the ethylene copolymer having a density of from 0.916 g/cc to 0.930 g/cc, a melt index ($I_2$) of from 0.1 to 1.0 g/10 min, a melt flow ratio ($I_{21}/I_2$) of from 32 to 50, a molecular weight distribution ($M_w/M_n$) of from 3.6 to 6.5, a reverse comonomer distribution profile as determined by GPC-FTIR, a multimodal TREF profile, and a composition distribution breadth index $CDBI_{50}$ of from 35 to 70 wt % as determined by TREF; wherein the polymerization catalyst system comprises a single transition metal catalyst, a support, a catalyst activator, and a catalyst modifier; and wherein the single transition metal catalyst is a group 4 phosphinimine catalyst.

Provided is an ethylene copolymer having a density of from 0.916 g/cc to 0.930 g/cc, a melt index ($I_2$) of from 0.1 to 1.0 g/10 min, a melt flow ratio ($I_{21}/I_2$) of from 32 to 50, a molecular weight distribution (MS/Mn) of from 3.6 to 6.5, a reverse comonomer distribution profile as determined by GPC-FTIR, a multimodal TREF profile, and a composition distribution breadth index $CDBI_{50}$ of from 35 to 70 wt % as determined by TREF; wherein the ethylene copolymer is made by a process for polymerizing ethylene and an alpha olefin having 3-8 carbon atoms in a single reactor in the presence of a polymerization catalyst system comprising a single transition metal catalyst, a support, and a catalyst activator; and wherein the single transition metal catalyst is a group 4 phosphinimine catalyst.

Provided is an ethylene copolymer having a density of from 0.916 g/cc to 0.930 g/cc, a melt index ($I_2$) of from 0.2 to 0.85 g/10 min, a melt flow ratio ($I_{21}/I_2$) of from 36 to 50, a molecular weight distribution ($M_w/M_n$) of from 4.0 to 6.0, a Z-average molecular weight distribution ($M_z/M_w$) of from 2.0 to 4.0, a reverse comonomer distribution profile as determined by GPC-FTIR, a multimodal TREF profile defined by three intensity peaks occurring at elution temperatures T(low), T(med) and T(high) where T(low) occurs at from 62° C. to 82° C., T(med) occurs at from 76° C. to 89° C. but is higher than T(low), and T(high) occurs at from 90° C. to 100° C., and a composition distribution breadth index $CDBI_{50}$ of from 35 to 70 wt % as determined by TREF; wherein the ethylene copolymer is made by a process for polymerizing ethylene and an alpha olefin having 3-8 carbon atoms in a single gas phase reactor in the presence of a polymerization catalyst system comprising a single transition metal catalyst, a support, and a catalyst activator; and wherein the single transition metal catalyst is a group 4 organotransition metal catalyst.

Provided is an ethylene copolymer which is not a blend, having a density of from 0.916 g/cc to 0.930 g/cc, a melt index ($I_2$) of from 0.2 to 0.85 g/10 min, a melt flow ratio ($I_{21}/I_2$) of from 36 to 50, a molecular weight distribution ($M_w/M_n$) of from 4.0 to 6.0, a Z-average molecular weight distribution ($M_z/M_w$) of from 2.0 to 4.0, a reverse comonomer distribution profile as determined by GPC-FTIR, a multimodal TREF profile defined by three intensity peaks occurring at elution temperatures T(low), T(med) and T(high) where T(low) occurs at from 62° C. to 82° C., T(med) occurs at from 76° C. to 89° C. but higher than T(low), and T(high) occurs at from 90° C. to 100° C., and a composition distribution breadth index $CDBI_{50}$ of from 35 to 70 wt % as determined by TREF.

Provided is a film having a dart impact of greater than 500 g/mil, a 1% MD secant modulus of greater than 150 MPa, a 1% TD secant modulus of greater than 175 MPa and a ratio of MD tear to TD of 0.75 or less; wherein the film comprises an ethylene copolymer having a density of from 0.916 g/cc to 0.930 g/cc, a melt index ($I_2$) of from 0.1 to 1.0 g/10 min, a melt flow ratio ($I_{21}/I_2$) of from 32 to 50, a molecular weight distribution ($M_w/M_n$) of from 3.6 to 6.5, a reverse comonomer distribution profile as determined by GPC-FTIR, a multimodal TREF, and a composition distribution breadth index $CDBI_{50}$ of from 35 to 70 wt % as determined by TREF; and wherein the ethylene copolymer is made by a process for polymerizing ethylene and an alpha olefin having 3-8 carbon atoms in a single reactor in the presence of a polymerization catalyst system comprising a single transition metal catalyst, a support, a catalyst activator and a catalyst modifier; and wherein the single transition metal catalyst is a group 4 phosphinimine catalyst.

Provided is a film having a dart impact of greater than 500 g/mil, a 1% MD secant modulus of greater than 150 MPa, a 1% TD secant modulus of greater than 175 MPa and a ratio of MD tear to TD of 0.75 or less; wherein the film comprises an ethylene copolymer which is not a blend, having a density of from 0.916 g/cc to 0.930 g/cc, a melt index ($I_2$) of from 0.2 to 0.85 g/10 min, a melt flow ratio ($I_{21}/I_2$) of from 36 to 50, a molecular weight distribution ($M_w/M_n$) of from 4.0 to 6.0, a Z-average molecular weight distribution ($M_z/M_w$) of from 2.0 to 4.0, a reverse comonomer distribution profile as determined by GPC-FTIR, a multimodal TREF profile defined by three intensity peaks occurring at elution temperatures T(low), T(med) and T(high) where T(low) occurs at from 62° C. to 82° C., T(med) occurs at from 76° C. to 89° C. but higher than T(low), and T(high) occurs at from 90° C. to 100° C., and a composition distribution breadth index $CDBI_{50}$ of from 45 to 69 wt % as determined by TREF.

Provided is an olefin polymerization process to produce an ethylene copolymer, the process comprising contacting ethylene and at least one alpha olefin having from 3-8 carbon atoms with a polymerization catalyst system in a single gas phase reactor to give an ethylene copolymer having a density of from 0.916 g/cc to 0.930 g/cc, a melt index ($I_2$) of from 0.2 to 0.85 g/10 min, a melt flow ratio ($I_{21}/I_2$) of from 36 to 50, a molecular weight distribution ($M_w/M_n$) of from 4.0 to 6.0, a Z-average molecular weight distribution ($M_z/M_w$) of from 2.0 to 4.0, a reverse comonomer distribution profile as determined by GPC-FTIR, a multimodal TREF profile defined by three intensity peaks occurring at elution temperatures T(low), T(med) and T(high) where T(low) occurs at from 62° C. to 82° C., T(med) occurs at from 76° C. to 89° C. but higher than T(low), and T(high) occurs at from 90° C. to 100° C., and a composition distribution breadth index $CDBI_{50}$ of from 35 to 70% as determined by TREF; wherein the polymerization catalyst system comprises a single transition metal catalyst, a support, and a catalyst activator, and wherein the single transition metal catalyst is a group 4 organotransition metal catalyst.

Provided is an ethylene copolymer having a density of from 0.916 g/cc to 0.930 g/cc, a melt index ($I_2$) of from 0.1 to 1.0 g/10 min, a melt flow ratio ($I_{21}/I_2$) of from 32 to 50, a molecular weight distribution ($M_w/M_n$) of from 3.6 to 6.5, a reverse comonomer distribution profile as determined by GPC-FTIR, a multimodal TREF profile, and a composition distribution breadth index $CDBI_{50}$ of from 35 to 70 wt % as determined by TREF, and which satisfies the following relationships:

$$\delta^{XO} \leq [80 - 1.22(CDBI_{50})/(M_w/M_n)]; \text{ and} \quad \text{(i)}$$

$$(M_w/M_n) \geq 68[(I_{21}/I_2)^{-1} + 10^{-6}(M_n)]; \quad \text{(ii)}$$

wherein the ethylene copolymer is made by a process for polymerizing ethylene and an alpha olefin having 3-8 carbon atoms in a single gas phase reactor in the presence of a polymerization catalyst system comprising a single transition metal catalyst, a support, and a catalyst activator, and wherein the single transition metal catalyst is a group 4 organotransition metal catalyst.

In an embodiment of the invention, the ethylene copolymer satisfies the following relationship: $\delta^{XO} \leq 96-2.14 [(MFR^{0.5})+1\times10^{-4} (M_w-M_n)]$.

In an embodiment of the invention, the ethylene copolymer has a $CDBI_{50}$ of from 45 to 69 wt %.

DETAILED DESCRIPTION OF PREFERRED EMBODIMENTS

Figure 1:
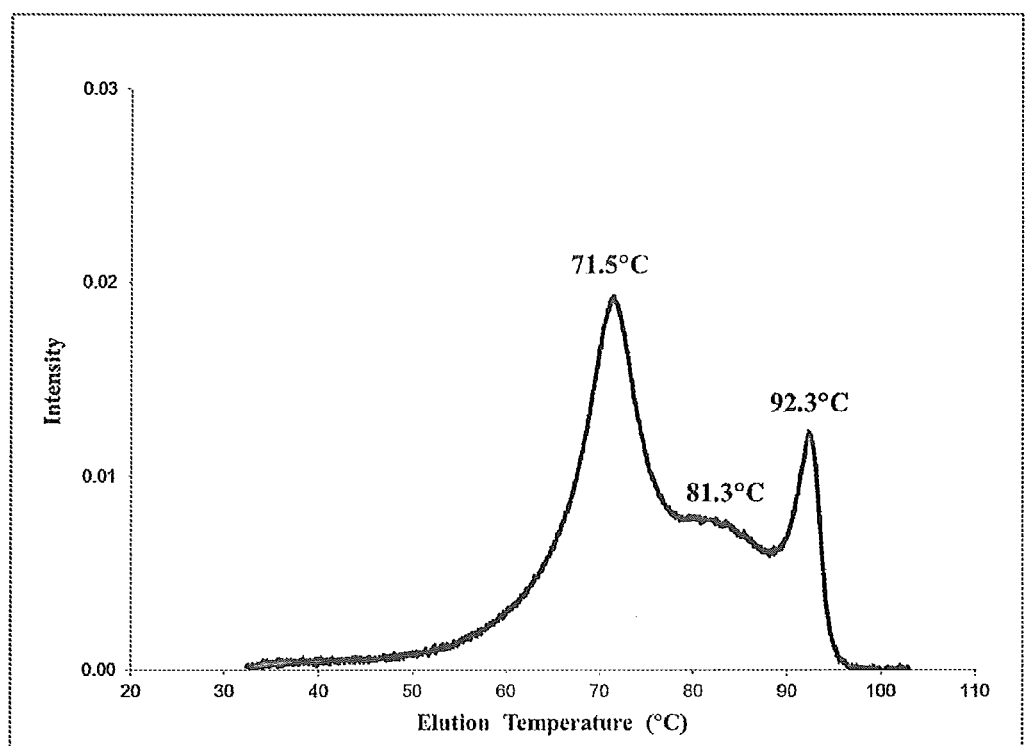
FIG. 1 shows a temperature rising elution fractionation (TREF) analysis and profile of an ethylene copolymer made according to the present invention.

The present invention provides ethylene copolymers having a relatively high melt flow ratio and a multimodal profile in a temperature rising elution fractionation (TREF) plot. The copolymers can be made into film having high dart impact values and good stiffness properties under decreased extruder pressures and at good output rates.

Polymerization Catalyst System

The polymerization catalyst system used in the present invention will comprise a single transition metal catalyst, but may comprise further components such as but not limited to a support(s), catalyst activator(s), and catalyst modifier(s). The term "single transition metal catalyst" and similar terms means that during preparation of the polymerization catalyst system, only one type of active transition metal catalyst is included, and excludes polymerization catalyst systems which comprise two or more different active transition metal catalysts such as mixed catalysts and dual catalysts.

Preferably, the transition metal catalyst is an organometallic catalyst based on a group 4 transition metal. By organometallic catalyst it is meant that the catalyst will have at least one ligand within the transition metal coordination sphere which is bonded to the metal via at least one carbon-metal bond. Such catalysts may collectively be called "organotransition metal catalysts" or "group 4 organotransition metal catalysts" when based on a group 4 metal.

Preferably, the organotransition metal catalyst is a single site catalyst based on a group 4 metal (where the number refers to columns in the Periodic Table of the Elements using IUPAC nomenclature). This includes titanium, hafnium and zirconium. The most preferred organotransition metal catalysts are group 4 metal complexes in their highest oxidation state.

A particular organotransition metal catalyst that is especially useful in the present invention is a group 4 organotransition metal catalyst further comprising a phosphinimine ligand. Any organometallic catalyst/compound/complex having a phosphinimine ligand and which can be used to make the copolymer compositions further defined and described below (in the section titled "The Ethylene Copolymer Composition") are contemplated for use in the current Invention. In the present invention, organotransition metal catalysts having at least one phosphinimine ligand and which are active in the polymerization of olefins to polymers are termed "phosphinimine catalysts".

Transition metal catalysts usually require activation by one or more cocatalytic or catalyst activator species in order to provide polymer. Hence, transition metal polymerization catalysts are sometimes called "pre-catalysts".

In a preferred embodiment of the invention, the phosphinimine catalyst is defined by the formula: $L(Pl)MX_2$ where M is a group 4 transition metal selected from Ti, Hf, Zr; Pl is a phosphinimine ligand; L is a substituted or unsubstituted cyclopentadienyl type ligand; and X is an activatable ligand.

In a preferred embodiment of the invention, the phopshinimine catalyst will have a phosphinimine ligand which is not bridged to, or does not make a bridge with another ligand within the metal coordination sphere of the phosphinimine catalyst, such as for example a cyclopentadienyl type ligand.

In a preferred embodiment of the invention, the phopshinimine catalyst will have a cyclopentadienyl type ligand which is not bridged to, or does not make a bridge with another ligand within the metal coordination sphere of the phosphinimine catalyst, such as for example a phosphinimine ligand.

The phosphinimine ligand is defined by the formula: $R^1_3P=N-$ wherein each $R^1$ is independently selected from the group consisting of a hydrogen atom; a halogen atom; a $C_{1-20}$ hydrocarbyl radical which is unsubstituted or further substituted by one or more halogen atom; a $C_{1-20}$ alkyl radical; a $C_{1-8}$ alkoxy radical; a $C_{6-10}$ aryl or aryloxy radical; an amido radical; a silyl radical; and a germanyl radical; P is phosphorus and N is nitrogen (which bonds to the metal M).

In an embodiment of the invention, the phosphinimine ligand is chosen so that each $R^1$ is a hydrocarbyl radical. In a particular embodiment of the invention, the phosphinimine ligand is tri-(tertiarybutyl)phosphinimine (i.e. where each $R^1$ is a tertiary butyl group or t-Bu group for short).

As used herein, the term "cyclopentadienyl-type" ligand is meant to include ligands which contain at least one five carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current invention, so long as the five carbon ring which bonds to the metal via eta-5 (or in some cases eta-3) bonding remains intact. An exemplary list of substituents for a cyclopentadienyl ligand, an indenyl ligand (or hydrogenated version thereof) and a fluorenyl ligand (or hydrogenated version thereof) includes the group consisting of a $C_{1-20}$ hydrocarbyl radical (which hydrocarbyl radical may be unsubstituted or further substituted by for example a halide and/or a hydrocarbyl group; for example a suitable substituted $C_{1-20}$ hydrocarbyl radical is a pentafluorobenzyl group such as —$CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —$Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula —$Ge(R')_3$ wherein R' is as defined directly above.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$).

In an embodiment of the invention, the phosphinimine catalyst will have a single or multiply substituted Indenyl ligand and a phosphinimine ligand which is substituted by three tertiary butyl substituents.

Unless stated otherwise, the term "indenyl" (or "Ind" for short) connotes a fully aromatic bicyclic ring structure.

An indenyl ligand (or "Ind" for short) as defined in the present Invention will have framework carbon atoms with the numbering scheme provided below, so the location of a substituent can be readily identified.

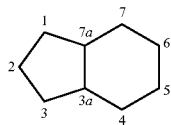

In an embodiment of the invention, the phosphinimine catalyst will have a singly substituted indenyl ligand and a phosphinimine ligand which is substituted by three tertiary butyl substituents.

In an embodiment of the invention, the phosphinimine catalyst will have a singly or multiply substituted indenyl ligand where the substituent is selected from the group consisting of a substituted or unsubstituted alkyl group, a substituted or an unsubstituted aryl group, and a substituted or unsubstituted benzyl (e.g. $C_6H_5CH_2$—) group. Suitable substituents for the alkyl, aryl or benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, $R^2$-Indenyl, where the $R^2$ substituent is a substituted or unsubstituted alkyl group, a substituted or an unsubstituted aryl group, or a substituted or unsubstituted benzyl group. Suitable substituents for an $R^2$ alkyl, $R^2$ aryl or $R^2$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have an indenyl ligand having at least a 1-position substitutent (1-$R^2$) where the substituent $R^2$ is a substituted or unsubstituted alkyl group, a substituted or an unsubstituted aryl group, or a substituted or unsubstituted benzyl group. Suitable substituents for an $R^2$ alkyl, $R^2$ aryl or $R^2$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^2$-Indenyl where the substituent $R^2$ is in the 1-position of the indenyl ligand and is a substituted or unsubstituted alkyl group, a substituted or unsubstituted aryl group, or a substituted or an unsubstituted benzyl group. Suitable substituents for an $R^2$ alkyl, $R^2$ aryl or $R^2$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^2$-Indenyl, where the substituent $R^2$ is a (partially/fully) halide substituted alkyl group, a (partially/fully) halide substituted benzyl group, or a (partially/fully) halide substituted aryl group.

In an embodiment of the invention, the phosphinimine catalyst will have a singly substituted indenyl ligand, 1-$R^2$-Indenyl, where the substituent $R^2$ is a (partially/fully) halide substituted benzyl group.

When present on an indenyl ligand, a benzyl group can be partially or fully substituted by halide atoms, preferably fluoride atoms. The aryl group of the benzyl group may be a perfluorinated aryl group, a 2,6 (i.e. ortho) fluoro substituted phenyl group, 2,4,6 (i.e. ortho/para) fluoro substituted phenyl group or a 2,3,5,6 (i.e. ortho/meta) fluoro substituted phenyl group respectively. The benzyl group is, in an embodiment of the invention, located at the 1 position of the indenyl ligand.

In an embodiment of the invention, the phosphinimine catalyst will have a singly substituted indenyl ligand, 1-$R^2$-Indenyl, where the substituent $R^2$ is a pentafluorobenzyl ($C_6F_5CH_2$—) group.

In an embodiment of the invention, the phosphinimine catalyst has the formula: (1-$R^2$-(Ind))M(N=P(t-Bu)$_3$)X$_2$ where $R^2$ is a substituted or unsubstituted alkyl group, a substituted or an unsubstituted aryl group, or a substituted or unsubstituted benzyl group, wherein substituents for the alkyl, aryl or benzyl group are selected from the group consisting of alkyl, aryl, alkoxy, aryloxy, alkylaryl, arylalkyl and halide substituents; M is Ti, Zr or Hf; and X is an activatable ligand.

In an embodiment of the invention, the phosphinimine catalyst has the formula: $(1\text{-}R^2\text{-}(Ind))M(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the invention, the phosphinimine catalyst has the formula: $(1\text{-}R^2\text{-}(Ind))M(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the invention, the phosphinimine catalyst has the formula: $(1\text{-}R^2\text{-}(Ind))Ti(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the invention, the phosphinimine catalyst has the formula: $(1\text{-}C_6F_5CH_2\text{-}Ind)M(N=P(t\text{-}Bu)_3)X_2$, where M is Ti, Zr or Hf; and X is an activatable ligand.

In an embodiment of the invention, the phosphinimine catalyst has the formula: $(1\text{-}C_6F_5CH_2\text{-}Ind)Ti(N=P(t\text{-}Bu)_3)X_2$, where X is an activatable ligand.

Although, not preferred, other organotransition metal catalysts which may also be contemplated for use in the present invention include metallocene catalysts (which have two cyclopentadienyl type ligands), and constrained geometry catalysts (which have an amido type ligand and a cydopentadienyl type ligand). Some non-limiting examples of metallocene catalysts, which may or may not be useful, can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts, which may or may not be useful, can be found in U.S. Pat. Nos. 5,057,475; 5,096,867; 5,064,802; 5,132,380; 5,703,187 and 6,034,021, all of which are incorporated by reference herein in their entirety.

In the current invention, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present invention, the activatable ligand, X is independently selected from the group consisting of a hydrogen atom; a halogen atom, a $C_{1\text{-}10}$ hydrocarbyl radical; a $C_{1\text{-}10}$ alkoxy radical; and a $C_{6\text{-}10}$ aryl or aryloxy radical, where each of the hydrocarbyl, alkoxy, aryl, or aryl oxide radicals may be un-substituted or further substituted by one or more halogen or other group; a $C_{1\text{-}8}$ alkyl; a $C_{1\text{-}8}$ alkoxy, a $C_{6\text{-}10}$ aryl or aryloxy; an amido or a phosphido radical, but where X is not a cyclopentadienyl. Two X ligands may also be joined to one another and form for example, a substituted or unsubstituted diene ligand (i.e. 1,3-butadiene); or a delocalized heteroatom containing group such as an acetate or acetamidinate group. In a convenient embodiment of the invention, each X is independently selected from the group consisting of a halide atom, a $C_{1\text{-}4}$ alkyl radical and a benzyl radical.

Particularly suitable activatable ligands are monoanionic such as a halide (e.g. chloride) or a hydrocarbyl (e.g. methyl, benzyl).

The catalyst activator (or simply the "activator" for short) used to activate the transition metal polymerization catalyst can be any suitable activator including one or more activators selected from the group consisting of alkylaluminoxanes and ionic activators, optionally together with an alkylating agent.

Without wishing to be bound by theory, alkylaluminoxanes are thought to be complex aluminum compounds of the formula:

$R^3_2Al^1O(R^3Al^1O)_mAl^1R^3_2$, wherein each $R^3$ is independently selected from the group consisting of $C_{1\text{-}20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

The alkylaluminoxanes are typically used in substantial molar excess compared to the amount of group 4 transition metal in the organometallic compound/complex. The $Al^1$:group 4 transition metal molar ratios may be from about 10:1 to about 10,000:1, preferably from about 30:1 to about 500:1.

In an embodiment of the invention, the catalyst activator is methylaluminoxane (MAO).

In an embodiment of the invention, the catalyst activator is modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the catalyst activator of the present invention may be a combination of an alkylating agent (which may also serve as a scavenger) with an activator capable of ionizing the group 4 of the transition metal catalyst (i.e. an Ionic activator). In this context, the activator can be chosen from one or more alkylaluminoxane and/or an ionic activator, since an alkylaluminoxane may serve as both an activator and an alkylating agent.

When present, the alkylating agent may be selected from the group consisting of $(R^4)_pMgX^2_{2-p}$ wherein $X^2$ is a halide and each $R^4$ is independently selected from the group consisting of $C_{1\text{-}10}$ alkyl radicals and p is 1 or 2; $R^4Li$ wherein in $R^4$ is as defined above, $(R^4)_qZnX^2_{2-q}$ wherein $R^4$ is as defined above, $X^2$ is halogen and q is 1 or 2; $(R^4)_sAl^2X^2_{3-s}$ wherein $R^4$ is as defined above, $X^2$ is halogen and s is an integer from 1 to 3. Preferably in the above compounds $R^4$ is a $C_{1\text{-}4}$ alkyl radical, and $X^2$ is chlorine. Commercially available compounds include triethyl aluminum (TEAL), diethyl aluminum chloride (DEAC), dibutyl magnesium $((Bu)_2Mg)$, and butyl ethyl magnesium (BuEtMg or BuMgEt).

The ionic activator may be selected from the group consisting of: (i) compounds of the formula $[R^5]^+[B(R^6)_4]^-$ wherein B is a boron atom, $R^5$ is a cyclic $C_{5\text{-}7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1\text{-}4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1\text{-}4}$ alkyl radical; and (ii) compounds of the formula $[(R^8)_t ZH]^+ [B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^6$ is as defined above; and (iii) compounds of the formula $B(R^6)_3$ wherein R is as defined above. Alkylaluminoxanes can also be used as alkylating agents.

In the above compounds preferably $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the transition metal catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl) boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyltrispentafluorophenyl borate, benzene (diazonium)phenyltrispentafluorophenyl borate, tropillium tetrakis (2,3,5,6-tetrafluorophenyl)borate, triphenylmethylium tetrakis (2,3,5,6-tetrafluorophenyl)borate, benzene (diazonium) tetrakis (3,4,5-trifluorophenyl)borate, tropillium tetrakis (3,4,5-trifluorophenyl)borate, benzene (diazonium) tetrakis (3,4,5-trifluorophenyl)borate, tropillium tetrakis (1,2,2-trifluoroethenyl)borate, trophenylmethylium tetrakis (1,2,2-trifluoroethenyl)borate, benzene (diazonium) tetrakis (1,2,2-trifluoroethenyl)borate, tropillium tetrakis (2,3,4,5-tetrafluorophenyl) borate, triphenylmethylium tetrakis (2,3,4,5-tetrafluorophenyl)borate, and benzene (diazonium) tetrakis (2,3,4,5-tetrafluorophenyl)borate.

Commercially available activators which are capable of ionizing the transition metal catalyst include: N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and trispentafluorophenyl boron.

In an embodiment of the invention, the ionic activator compounds may be used in amounts which provide a molar ratio of group 4 transition metal to boron that will be from 1:1 to 1:6.

Optionally, mixtures of alkylaluminoxanes and ionic activators can be used as activators for the organometallic complex.

In the current Invention, the polymerization catalyst system will preferably comprise an inert support (note: the terms "support" and "inert support" are used interchangeably in the present invention). In a particular embodiment of the invention, the polymerization catalyst system comprises a phosphinimine catalyst which is supported on an inert support.

The inert support used in the present invention can be any support known in the art to be suitable for use with polymerization catalysts. For example the support can be any porous or non-porous support material, such as talc, Inorganic oxides, Inorganic chlorides, aluminophosphates (i.e. AlPO$_4$) and polymer supports (e.g. polystyrene, etc). Hence, supports include Group 2, 3, 4, 5, 13 and 14 metal oxides generally, such as silica, alumina, silica-alumina, magnesium oxide, magnesium chloride, zirconia, titania, clay (e.g. montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In an embodiment of the invention, the support is calcined at temperatures above 200° C., or above 300° C., or above 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an Inorganic oxide, typically has a surface area of from about 10 to about 700 m$^2$/g, a pore volume in the range from about 0.1 to about 4.0 cc/g and an average particle size of from about 5 to about 500 μm. In a more specific embodiment, the support material has a surface area of from about 50 to about 500 m$^2$/g, a pore volume in the range from about 0.5 to about 3.5 cc/g and an average particle size of from about 10 to about 200 μm. In another more specific embodiment the support material has a surface area of from about 100 to about 400 m$^2$/g, a pore volume in the range from about 0.8 to about 3.0 cc/g and an average particle size of from about 5 to about 100 μm.

The support material, especially an inorganic oxide, typically has an average pore size (i.e. pore diameter) of from about 10 to about 1000 Angstroms(Å). In a more specific embodiment, the support material has an average pore size of from about 50 to about 500 Å. In another more specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pg 309-319.

A silica support which is suitable for use in the present invention has a high surface area and is amorphous. By way of example only, useful silicas are commercially available under the trademark of Sylopol® 958, 955 and 2408 by the Davison Catalysts, a Division of W. R. Grace and Company and ES-70W by Ineos Silica.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

An agglomerate of clay and inorganic oxide which is useful in the current invention may have the following properties: a surface area of from about 20 to about 800 m$^2$/g, preferably from 50 to about 600 m$^2$/g; particles with a bulk density of from about 0.15 to about 1 g/ml, preferably from about 0.20 to about 0.75 g/ml; an average pore diameter of from about 30 to about 300 Angstroms (Å), preferably from about 60 to about 150 Å; a total pore volume of from about 0.10 to about 2.0 cc/g, preferably from about 0.5 to about 1.8 cc/g; and an average particle size of from about 4 to 250 microns (μm), preferably from about 8 to 100 microns.

Alternatively, a support, for example a silica support, may be treated with one or more salts of the type: $Zr(SO_4)_2 \cdot 4H_2O$, $ZrO(NO_3)_2$, and $Fe(NO_3)_3$ as taught in co-pending Canadian Patent Application No. 2,716,772. Supports that have been otherwise chemically treated are also contemplated for use with the catalysts and processes of the present invention.

The present invention is not limited to any particular procedure for supporting a transition metal catalyst or catalyst system components. Processes for depositing such catalysts (e.g. a phosphinimine catalyst) as well as a catalyst activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods to support an organotransition metal catalyst see U.S. Pat. No. 5,965,677). For example, a transition metal catalyst (e.g. a phosphinimine catalyst) may be added to a support by co-precipitation with the support material. The activator can be added to the support before and/or after the transition metal catalyst or together with the transition metal catalyst. Optionally, the activator can be added to a supported transition metal catalyst in situ or a transition metal catalyst may be added to the support in situ or a transition metal catalyst can be added to a supported activator in situ. A transition metal catalyst may be slurried or dissolved in a suitable diluent or solvent and then added to the support. Suitable solvents or diluents include but are not limited to hydrocarbons and mineral oil. A transition metal catalyst for example, may be added to the solid support, in the form of a solid, solution or slurry, followed by the addition of the activator in solid form or as a solution or slurry. Transition metal catalyst (e.g. phosphinimine catalyst), catalyst activator, and support can be mixed together in the presence or absence of a solvent.

Polymerization Process

The copolymer compositions of the present invention are preferably made using a single reactor, preferably a single gas phase or slurry phase reactor. Use of a polymerization catalyst system comprising a single transition metal catalyst in a single gas phase reactor is especially preferred.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or Isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let-down valves the slurry enters a settling leg and then is let down in pressure to flash the diluent and unreacted monomers and recover the polymer generally in a cyclone. The diluent and unreacted monomers are recovered and recycled back to the reactor.

A gas phase polymerization process is commonly carried out in a fluidized bed reactor. Such gas phase processes are widely described in the literature (see for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomer (and comonomers) flowing through the bed. Unreacted monomer, comonomer and other optional gaseous components exit the fluidized bed and are contacted with a cooling system to remove this heat. The cooled gas stream, including monomer, comonomer and optional other components (such as condensable liquids), is then re-circulated through the polymerization zone, together with "make-up" monomer (and comonomer) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 psig. In a more specific embodiment, the pressure can range from about 100 psig (690 kPa) to about 500 psig (3448 kPa). In another more specific embodiment, the pressure can range from about 200 psig (1379 kPa) to about 400 psig (2759 kPa). In yet another more specific embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene but other monomers (i.e. comonomers) may also be employed. Monomers and comonomers Include ethylene and $C_{3-12}$ alpha olefins respectively, where $C_{3-12}$ alpha olefins are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-tert-butyl styrene, and the constrained-ring cyclic olefins such as cyclobutene, cyclopentene, dicyclopentadiene norbomene, alkyl-substituted norbomenes, alkenyl-substituted norbomenes and the like (e.g. 5-methylene-2-norbomene and 5-ethylidene-2-norbornene, bicyclo-(2,2,1)-hepta-2,5-diene).

In one embodiment, the invention is directed toward a polymerization process involving the polymerization of ethylene with one or more of comonomer(s) including linear or branched comonomer(s) having from 3 to 30 carbon atoms, preferably 3-12 carbon atoms, more preferably 3 to 8 carbon atoms.

The process is particularly well suited to the copolymerization reactions involving the polymerization of ethylene in combination with one or more of the comonomers, for example alpha-olefin comonomers such as propylene, butene-1, pentene-1,4-methylpentene-1, hexene-1, octene-1, decene-1, styrene and cyclic and polycyclic olefins such as cyclopentene, norbornene and cydohexene or a combination thereof. Other comonomers for use with ethylene can include polar vinyl monomers, diolefins such as 1,3-butadiene, 1,4-pentadiene, 1,4-hexadiene, 1,5-hexadiene, norbomadiene, and other unsaturated monomers including acetylene and aldehyde monomers. Higher alpha-olefins and polyenes or macromers can be used also.

Preferably, the comonomer is an alpha-olefin having from 3 to 15 carbon atoms, preferably 4 to 12 carbon atoms and most preferably 4 to 10 carbon atoms.

In an embodiment of the invention, ethylene comprises at least 75 wt % of the total weight of monomer (i.e. ethylene) and comonomer (i.e. alpha olefin) that is fed to a polymerization reactor.

In an embodiment of the invention, ethylene comprises at least 85 wt % of the total weight of monomer (i.e. ethylene) and comonomer (i.e. alpha olefin) that is fed to a polymerization reactor.

In an embodiment of the invention, ethylene is polymerized with at least two different comonomers to form a terpolymer and the like, the preferred comonomers are a combination of monomers, alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbomadiene, ethylene/propylene/1,4-hexadiene and the like.

In an embodiment of the invention, a copolymer of ethylene and an alpha-olefin having from 3-8 carbon atoms is made in a single reactor in the presence of a polymerization catalyst system comprising a single group 4 organotransition metal catalyst.

In an embodiment of the Invention, a copolymer of ethylene and an alpha-olefin having from 3-8 carbon atoms is made in a single gas phase reactor in the presence of a polymerization catalyst system comprising a single group 4 organotransition metal catalyst.

In an embodiment of the invention, a copolymer of ethylene and an alpha-olefin having from 3-8 carbon atoms is made in a single reactor in the presence of a polymerization catalyst system comprising a single group 4 organotransition metal catalyst; a catalyst activator; and a support.

In an embodiment of the invention, a copolymer of ethylene and an alpha-olefin having from 3-8 carbon atoms is made in a single gas phase reactor in the presence of a polymerization catalyst system comprising a single group 4 organotransition metal catalyst; a catalyst activator; and a support.

In an embodiment of the invention, a copolymer of ethylene and an alpha-olefin having from 3-8 carbon atoms is made in a single gas phase reactor in the presence of a polymerization catalyst system comprising a single transition metal catalyst, where the single transition metal catalyst is a group 4 phosphinimine catalyst.

In an embodiment of the Invention, a copolymer of ethylene and an alpha-olefin having from 3-8 carbon atoms is made in a single gas phase reactor in the presence of a polymerization catalyst system comprising a single transition metal catalyst, where the single transition metal catalyst is a group 4 phosphinimine catalyst. having the formula:

$(1-R^2\text{-Indenyl})Ti(N\!\!=\!\!P(t\text{-}Bu)_3)X_2$;

wherein $R^2$ is a substituted or unsubstituted alkyl group, a substituted or an unsubstituted aryl group, or a substituted or unsubstituted benzyl group, wherein substituents for the alkyl, aryl or benzyl group are selected from the group consisting of alkyl, aryl, alkoxy, aryloxy, alkylaryl, arylalkyl and halide substituents; and wherein X is an activatable ligand.

In an embodiment of the invention, a copolymer of ethylene and an alpha-olefin having from 3-8 carbon atoms is made in a single gas phase reactor with a polymerization catalyst system comprising: a phosphinimine catalyst; an alkylaluminoxane cocatalyst; and a support.

In an embodiment of the invention, a copolymer of ethylene and an alpha-olefin having from 3-8 carbon atoms is made in a single gas phase reactor with a polymerization catalyst system comprising: a phosphinimine catalyst; an alkylaluminoxane cocatalyst; a support; and a catalyst modifier (which is further described below).

In an embodiment of the invention, a copolymer of ethylene and an alpha-olefin having from 3-8 carbon atoms is made in a single gas phase reactor with a polymerization catalyst system comprising: a phosphinimine catalyst having the formula $(1-R^2\text{-Ind})Ti(N\!\!=\!\!P(t\text{-}Bu)_3)X_2$ where $R^2$ is an alkyl group, an aryl group or a benzyl group wherein each of the alkyl group, the aryl group, or the benzyl group may be unsubstituted or substituted by at least one halide atom, and where X is an activatable ligand; and an activator.

In an embodiment of the invention, a copolymer of ethylene and an alpha-olefin having from 3-8 carbon atoms is made in a single gas phase reactor with a polymerization catalyst system comprising: a phosphinimine catalyst having the formula $(1-R^2\text{-Ind})Ti(N\!\!=\!\!P(t\text{-}Bu)_3)X_2$ where $R^2$ is an alkyl group, an aryl group or a benzyl group wherein each of the alkyl group, the aryl group, or the benzyl group may be unsubstituted or substituted by at least one halide atom, where X is an activatable ligand; an activator, and an inert support.

In an embodiment of the invention, a copolymer of ethylene and an alpha-olefin having from 3-8 carbon atoms is made in a single gas phase reactor with a polymerization catalyst system comprising: a phosphinimine catalyst having the formula $(1-R^2-Ind)Ti(N=P(t-Bu)_3)X_2$ where $R^2$ is an alkyl group, an aryl group or a benzyl group wherein each of the alkyl group, the aryl group, or the benzyl group may be unsubstituted or substituted by at least one halide atom, where X is an activatable ligand; an activator; an inert support; and a catalyst modifier.

In an embodiment of the invention, the copolymer is a copolymer of ethylene and an alpha-olefin having from 3-8 carbon atoms, and is made in a single gas phase reactor with a polymerization catalyst system comprising: a phosphinimine catalyst having the formula $(1-C_6F_5CH_2-Ind)Ti(N=P(t-Bu)_3)X_2$ where X is an activatable ligand; an activator; and an inert support.

In an embodiment of the invention, the copolymer is a copolymer of ethylene and an alpha-olefin having from 3-8 carbon atoms, and is made in a single gas phase reactor with a polymerization catalyst system comprising: a phosphinimine catalyst having the formula $(1-C_6F_5CH_2-Ind)Ti(N=P(t-Bu)_3)X_2$ where X is an activatable ligand; an activator; an inert support; and a catalyst modifier.

The polymerization catalyst system may be fed to a reactor system in a number of ways. If the transition metal catalyst is supported on a suitable support, the transition metal catalyst may be fed to a reactor in dry mode using a dry catalyst feeder, examples of which are well known in the art. Alternatively, a supported transition metal catalyst may be fed to a reactor as a slurry in a suitable diluent. If the transition metal catalyst is unsupported, the catalyst can be fed to a reactor as a solution or as a slurry in a suitable solvent or diluents. Polymerization catalyst system components, which may include a transition metal catalyst, an activator, a scavenger, an inert support, and a catalyst modifier, may be combined prior to their addition to a polymerization zone, or they may be combined on route to a polymerization zone. To combine polymerization catalyst system components on route to a polymerization zone they can be fed as solutions or slurries (in suitable solvents or diluents) using various feed line configurations which may become coterminous before reaching the reactor. Such configurations can be designed to provide areas in which catalyst system components flowing to a reactor can mix and react with one another over various "hold up" times which can be moderated by changing the solution or slurry flow rates of the catalyst system components.

Catalyst Modifier

A "catalyst modifier" is a compound which, when added to a polymerization catalyst system or used in the presence of the same in appropriate amounts, can reduce, prevent or mitigate at least one: of fouling, sheeting, temperature excursions, and static level of a material in polymerization reactor; can alter catalyst kinetics; and/or can alter the properties of copolymer product obtained in a polymerization process.

A long chain amine type catalyst modifier may be added to a reactor zone (or associated process equipment) separately from the polymerization catalyst system, as part of the polymerization catalyst system, or both as described in co-pending CA Pat. Appl. No. 2,742,461. The long chain amine can be a long chain substituted monoalkanolamine, or a long chain substituted dialkanolamine as described in co-pending CA Pat. Appl. No. 2,742,461, which is incorporated herein in full.

In an embodiment of the invention, the catalyst modifier employed comprises at least one long chain amine compound represented by the formula: $R^9R^{10}{}_xN((CH_2)_nOH)_y$, where $R^9$ is a hydrocarbyl group having from 5 to 30 carbon atoms, $R^{10}$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the catalyst modifier comprises at least one long chain substituted monoalkanolamine represented by the formula $R^9R^{10}N((CH_2)_nOH)$ where $R^9$ is a hydrocarbyl group having anywhere from 5 to 30 carbon atoms, $R^{10}$ is a hydrogen or a hydrocarbyl group having anywhere from 1 to 30 carbon atoms, and n is an integer from 1-20.

In an embodiment of the invention, the catalyst modifier comprises at least one long chain substituted dialkanolamine represented by the formula: $R^9N((CH_2)_nOH)((CH_2)_mOH)$ where $R^9$ is a hydrocarbyl group having anywhere from 5 to 30 carbon atoms, and n and m are integers from 1-20.

In an embodiment of the invention, the catalyst modifier comprises at least one long chain substituted dialkanolamine represented by the formula: $R^9N((CH_2)_xOH)_2$ where $R^9$ is a hydrocarbyl group having anywhere from 6 to 30 carbon atoms, and x is an integer from 1-20.

In an embodiment of the invention, the catalyst modifier comprises at least one long chain substituted dialkanolamine represented by the formula: $R^9N((CH_2)_xOH)_2$ where $R^9$ is a hydrocarbyl group having anywhere from 6 to 30 carbon atoms, and x is 2 or 3.

In an embodiment of the invention, the catalyst modifier comprises at least one long chain substituted dialkanolamine represented by the formula: $R^9N((CH_2)_xOH)_2$ where $R^9$ is a linear hydrocarbyl group having anywhere from 6 to 30 carbon atoms, and x is 2 or 3.

In an embodiment of the invention, the catalyst modifier comprises at least one long chain substituted dialkanolamine represented by the formula: $R^9N(CH_2CH_2OH)_2$ where $R^9$ is a linear hydrocarbyl group having anywhere from 6 to 30 carbon atoms.

In an embodiment of the invention, the catalyst modifier comprises at least one long chain substituted dialkanolamine represented by the formula: $R^9N(CH_2CH_2OH)_2$ where $R^9$ is a linear, saturated alkyl group having anywhere from 6 to 30 carbon atoms.

In an embodiment of the invention, the catalyst modifier comprises at least one long chain substituted dialkanolamine represented by the formula: $R^9N(CH_2CH_2OH)_2$ where $R^9$ is a hydrocarbyl group having anywhere from 8 to 22 carbon atoms.

In an embodiment of the invention, the catalyst modifier comprises a long chain substituted dialkanolamine represented by the formula: $C_{18}H_{37}N(CH_2CH_2OH)_2$.

In an embodiment of the invention, the catalyst modifier comprises long chain substituted dialkanolamines represented by the formulas: $C_{13}H_{27}N(CH_2CH_2OH)_2$ and $C_{15}H_{31}N(CH_2CH_2OH)_2$.

In an embodiment of the invention, the catalyst modifier comprises a mixture of long chain substituted dialkanolamines represented by the formula: $R^9N(CH_2CH_2OH)_2$ where $R^9$ is a hydrocarbyl group having anywhere from 8 to 18 carbon atoms.

Non limiting examples of catalyst modifiers which can be used in the present invention are Kemamine AS-990™, Kemamine AS-650™, Armostat-1800™, bis-hydroxy-cocoamine, 2,2'-octadecyl-amino-bisethanol, and Atmer-163™.

The amount of catalyst modifier added to a reactor (or other associated process equipment) is conveniently represented herein as the parts per million (ppm) of catalyst modifier based on the weight of copolymer produced.

The amount of catalyst modifier included in a polymerization catalyst system is conveniently represented herein as a weight percent (wt %) of the catalyst modifier based on the total weight of the polymerization catalyst system (e.g. the combined weight of the transition metal catalyst, the inert support, the cocatalyst and the catalyst modifier).

The catalyst modifier may be added to a polymerization reactor in a number of ways. The catalyst modifier may be added to a reactor system separately from the polymerization catalyst system or it may be combined with the polymerization catalyst system prior to feeding the combination to a reactor system.

If the catalyst modifier is added to the polymerization catalyst system prior to its addition to a reactor, then the catalyst modifier can be added at any point during the preparation of the polymerization catalyst system. Thus, one transition metal catalyst, at least one activator, at least one inert support and at least one catalyst modifier may be combined in any order to form a polymerization catalyst system suitable for use in the present invention. In specific embodiments of the invention: the catalyst modifier may be added to a support after both the transition metal catalyst and the cocatalyst have been added; the catalyst modifier may be added to a support before either of the transition metal catalyst or the cocatalyst are added; the catalyst modifier may be added to a support after the transition metal catalyst but before the cocatalyst; the catalyst modifier may be added to a support after the cocatalyst but before the transition metal catalyst. Also, the catalyst modifier can be added in portions during any stage of the preparation of the polymerization catalyst system.

The catalyst modifier may be included in the polymerization catalyst system (or where appropriate, added to a polymerization catalyst system component or components which may comprise one transition metal catalyst, the inert support and the cocatalyst) in any suitable manner. By way of non-limiting example, the catalyst modifier may be dry blended (if it is a solid) with the polymerization catalyst system (or a polymerization catalyst system component) or it may be added neat (if the catalyst modifier is a liquid) or it may be added as solution or slurry in a suitable hydrocarbon solvent or diluent respectively. The polymerization catalyst system (or polymerization catalyst system components) can likewise be put into solution or made into a slurry using suitable solvents or diluents respectively, followed by addition of the catalyst modifier (as a neat solid or liquid or as a solution or a slurry in suitable solvents or diluents) or vice versa. Alternatively, the catalyst modifier may be deposited onto a separate support and the resulting supported catalyst modifier blended either dry or in a slurry with the polymerization catalyst system (or a polymerization catalyst system component).

In an embodiment of the present invention, the catalyst modifier is added to a polymerization catalyst system already comprising the single transition metal catalyst, inert support and cocatalyst. The catalyst modifier can be added to the polymerization catalyst system offline and prior to addition of the polymerization catalyst system to the polymerization zone, or the catalyst modifier may be added to the polymerization catalyst system, or components on route to a polymerization reactor.

The catalyst modifier may be fed to a reactor system using any appropriate method known to persons skilled in the art. For example, the catalyst modifier may be fed to a reactor system as a solution or as a slurry in a suitable solvent or diluent respectively. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Alternatively, the catalyst modifier may be added to an inert support material and then fed to a polymerization reactor as a dry feed or a slurry feed. The catalyst modifier may be fed to various locations in a reactor system. When considering a fluidized bed process for example, the catalyst modifier may be fed directly to any area of the reaction zone (for example, when added as a solution), or any area of the entrainment zone, or it may be fed to any area within the recycle loop, where such areas are found to be effective sites at which to feed a catalyst modifier.

When added as a solution or mixture with a solvent or diluent respectively, the catalyst modifier may make up, for example, from 0.1 to 30 wt % of the solution or mixture, or from 0.1 to 20 wt %, or from 0.1 to 10 wt %, or from 0.1 to 5 wt % or from 0.1 to 2.5 wt % or from 0.2 to 2.0 wt %, although a person skilled in the art will recognize that further, possibly broader ranges, may also be used and so the invention should not be limited in this regard.

The catalyst modifier can be added to a reactor with all or a portion of one or more of the monomers or the cycle gas.

The catalyst modifier can be added to a reactor through a dedicated feed line or added to any convenient feed stream including an ethylene feed stream, a comonomer feed stream, a catalyst feed line or a recycle line.

The catalyst modifier can be fed to a location in a fluidized bed system in a continuous or intermittent manner.

In an embodiment of the invention, the rate of addition of a catalyst modifier to a reactor will be programmed using measured reactor static levels (or other lead indicators such as reactor temperature) as programming inputs, so as to maintain a constant or pre-determined level of static (or for example, temperature) in a polymerization reactor.

The catalyst modifier can be added to a reactor at a time before, after or during the start of the polymerization reaction The catalyst modifier may be added to the polymerization catalyst system or to one or more polymerization catalyst system components (e.g. a phosphinimine catalyst, inert support, or cocatalyst) on route to a reaction zone.

In an embodiment of the invention, the catalyst modifier is added directly to a reaction zone, separately from the polymerization catalyst system. Most typically, it is so added by spraying a solution or mixture of the catalyst modifier directly into a reaction zone.

In an embodiment of the invention, the catalyst modifier is included (combined) with the polymerization catalyst system before adding the combination directly to a reaction zone.

In an embodiment of the invention, the catalyst modifier is added to a polymer seed bed present in a reactor prior to starting the polymerization reaction by introduction of a catalyst.

In an embodiment of the invention, the catalyst modifier is added directly to a reaction zone, separately from a polymerization catalyst system, and the catalyst modifier is added as a mixture with an inert hydrocarbon.

In an embodiment of the invention, the catalyst modifier is added directly to a reaction zone, separately from a polymerization catalyst system, and the catalyst modifier is added as a mixture with an inert hydrocarbon, and is added during a polymerization reaction.

The total amount of catalyst modifier that may be fed to a reactor and/or included in the polymerization catalyst system is not specifically limited, but it should not exceed an amount which causes the organotransition metal based polymerization catalyst system activity to drop to below that which would be commercially acceptable.

In this regard, the amount of catalyst modifier fed to a reactor will generally not exceed about 150 ppm, or 100 ppm, or 75 ppm, or 50 ppm, or 25 ppm (parts per million based on the weight of the (co)polymer being produced) while the amount of catalyst modifier included in the polymerization catalyst system will generally not exceed about 10 weight percent (based on the total weight of the polymerization catalyst system, including the catalyst modifier).

In embodiments of the invention, the catalyst modifier fed to a reactor will be from 150 to 0 ppm, and including narrower ranges within this range, such as but not limited to, from 150 to 1 ppm, or from 150 to 5 ppm, or from 100 to 0 ppm, or from 100 to 1 ppm, or from 100 to 5 ppm, or from 75 to 0 ppm, or from 75 to 1 ppm, or from 75 to 5 ppm, or from 50 to 0 ppm, or from 50 to 1 ppm, or from 50 to 5 ppm, or from 25 to 0 ppm, or from 25 to 1 ppm, or from 25 to 5 ppm (parts per million by weight of the polymer being produced).

In embodiments of the invention, the amount of catalyst modifier included in the polymerization catalyst system will be from 0 to 10 weight percent, and including narrower ranges within this range, such as but not limited to, from 0 to 6.0 weight percent, or from 0.25 to 6.0 weight percent, or from 0 to 5.0 weight percent, or from 0.25 to 5.0 weight percent, or from 0 to 4.5 weight percent, or from 0.5 to 4.5 weight percent, or from 1.0 to 4.5 weight percent, or from 0.75 to 4.0 weight percent, or from 0 to 4.0 weight percent, or from 0.5 to 4.0 weight percent, or from 1.0 to 4.0 weight per cent, or from 0 to 3.75 weight percent, or from 0.25 to 3.75 weight percent, or from 0.5 to 3.5 weight percent, or from 1.25 to 3.75 weight percent, or from 1.0 to 3.5 weight percent, or from 1.5 to 3.5 weight percent, or from 0.75 to 3.75 weight percent, or from 1.0 to 3.75 weight percent (wt % is the weight percent of the catalyst modifier based on the total weight of the polymerization catalyst system; e.g. the combined weight of an organotransition metal catalyst, an inert support, a catalyst activator and a catalyst modifier).

Other catalyst modifiers may be used in the present invention and include compounds such as carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Polyoxyethylenealkylamines, which are described in for example in European Pat. Appl. No. 107,127, may also be used. Further catalyst modifiers include aluminum stearate and aluminum oleate. Catalyst modifiers are supplied commercially under the trademarks OCTASTAT™ and STADIS™. The catalyst modifier STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid.

Commercially available catalyst modifiers sometimes contain unacceptable amounts of water for use with polymerization catalysts. Accordingly, the catalyst modifier may be treated with a substance which removes water (e.g. by reaction therewith to form inert products, or adsorption or absorption methods), such as a metal alkyl scavenger or molecular sieves. See for example, U.S. Pat. Appl. No. 2011/0184124 for use of a scavenger compound to remove water from a metal carboxylate antistatic agent. Alternatively, and preferably, a catalyst modifier may be dried under reduced pressure and elevated temperatures to reduce the amount of water present (see the Examples section below). For example, a catalyst modifier may be treated with elevated temperatures (e.g. at least 10° C. above room temperature or ambient temperature) under reduced pressure (e.g. below atmospheric pressure) to distill off water, as can be achieved by using a dynamic vacuum pump.

Scavenger

Optionally, scavengers are added to the polymerization process. The present invention can be carried out in the presence of any suitable scavenger or scavengers.

Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula: $R^3{}_2Al^1O(R^3Al^1O)_mAl^1R^3{}_2$ wherein each $R^3$ is Independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally the scavenger is added to the reactor prior to the catalyst and in the absence of additional poisons and over time declines to 0, or is added continuously.

Optionally, the scavengers may be independently supported. For example, an inorganic oxide that has been treated with an organoaluminum compound or alkylaluminoxane may be added to the polymerization reactor. The method of addition of the organoaluminum or alkylaluminoxane compounds to the support is not specifically defined and is carried out by procedures well known in the art.

The Ethylene Copolymer Composition

In the present invention, the term "ethylene copolymer" is used interchangeably with the term "copolymer", or "polyethylene copolymer" and all connote a polymer consisting of polymerized ethylene units and at least one type of polymerized alpha olefin.

In the present invention, the ethylene copolymer compositions are preferably not polymer blends, but optionally they may be used as a component in a polymer blend. The term polymer "blend" is herein meant to connote a dry blend of two similar or different polymers, in-reactor blends arising from the use of multi or mixed catalyst systems in a single reactor zone, and blends that result from the use of one catalyst in at least two reactors operating under different polymerization conditions, or blends involving the use of at least two distinct catalysts in one or more reactors under the same or different conditions (e.g. a blend resulting from in series reactors each running under different conditions or with different catalysts).

Preferably the ethylene copolymer compositions are copolymers of ethylene and an alpha olefin selected from 1-butene, 1-hexene and 1-octene.

In embodiments of the invention, the ethylene copolymer composition will comprise at least 75 weight % of ethylene units, or at least 80 wt % of ethylene units, or at least 85 wt % of ethylene units with the balance being an alpha-olefin unit, based on the weight of the ethylene copolymer composition.

In embodiments of the invention, the ethylene copolymer will have a melt index ($I_2$) of from 0.01 to 3.0 g/10 min, or from 0.1 to 2.0 g/10 min, or from 0.25 to 2.0 g/10 min, or from 0.01 to 1.0 g/10 min, or from 0.1 to 1.0 g/10 min, or less than 1.0 g/10 min, or from 0.1 to less than 1.0 g/10 min, or from 0.25 to 1.0 g/10 min, or from 0.25 to 0.9 g/10 min, or from 0.25 to 0.80 g/10 min, or from 0.2 to 0.9 g/10 min, or from 0.20 to 0.85 g/10 min, or from 0.25 to 0.85 g/10 min.

In embodiments of the invention, the ethylene copolymer will have a density of from 0.916 g/cc to 0.932 g/cc including narrower ranges within this range, such as for example, from 0.917 g/cc to 0.932 g/cc, or from 0.916 g/cc to 0.930 g/cc, or 0.917 g/cc to 0.930 g/cc, or from 0.916 g/cc to 0.925 g/cc, or from 0.917 g/cc to 0.927 g/cc, or from 0.917 g/cc to 0.926 g/cc, or from 0.917 g/cc to 0.925 g/cc, or from 0.917 g/cc to 0.923 g/cc, or from 0.918 g/cc to 0.932 g/cc, or from 0.918 g/cc to 0.930 g/cc, or from 0.918 to 0.930 g/cc, or from 0.918 to 0.928 g/cc (note: "g" stands for gram; "cc" stands for cubic centimeter, $cm^3$)

In an embodiment of the invention, the ethylene copolymer will have a density of from 0.916 g/cc to 0.930 g/cc. In an embodiment of the invention, the ethylene copolymer will have a density of greater than 0.916 g/cc to less than 0.930 g/cc. In an embodiment of the invention, the ethylene copolymer will have a density of from 0.917 g/cc to 0.927 g/cc. In an embodiment of the invention, the ethylene copolymer composition will have a density of from 0.918 g/cc to 0.927 g/cc.

The ethylene copolymer of the present invention may have a unimodal, broad unimodal, bimodal, or multimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. By the term "bimodal" it is meant that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In an embodiment of the invention, the ethylene copolymer will have a unimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal distribution curve or profile.

In embodiments of the invention, the ethylene copolymer will exhibit a weight average molecular weight (Mw) as determined by gel permeation chromatography (GPC) of from 30,000 to 250,000, including narrower ranges within this range, such as for example, from 50,000 to 200,000, or from 50,000 to 175,000, or from 75,000 to 150,000, or from 80,000 to 125,000.

In embodiments of the invention, the ethylene copolymer will exhibit a number average molecular weight ($M_n$) as determined by gel permeation chromatography (GPC) of from 5,000 to 100,000 including narrower ranges within this range, such as for example from 7,500 to 100,000, or from 7,500 to 75,000, or from 7,500 to 50,000, or from 10,000 to 100,000, or from 10,000 to 75,000, or from 10,000 to 50,000.

In embodiments of the invention, the ethylene copolymer will exhibit a Z-average molecular weight ($M_Z$) as determined by gel permeation chromatography (GPC) of from 50,000 to 1,000,000 including narrower ranges within this range, such as for example from 75,000 to 750,000, or from 100,000 to 500,000, or from 100,000 to 400,000, or from 125,000 to 375,000, or from 150,000 to 350,000, or from 175,000 to 325,000.

In embodiments of the invention, the ethylene copolymer will have a molecular weight distribution ($M_w/M_n$) as determined by gel permeation chromatography (GPC) of from 3.5 to 7.0, including narrower ranges within this range, such as for example, from 3.5 to 6.5, or from 3.6 to 6.5, or from 3.6 to 6.0, or from 3.5 to 5.5, or from 3.6 to 5.5, or from 3.5 to 5.0, or from 4.0 to 6.0, or from 4.0 to 5.5.

In embodiments of the invention, the ethylene copolymer will have a Z average molecular weight distribution ($M_z/M_w$) as determined by gel permeation chromatography (GPC) of from 2.0 to 5.5, including narrower ranges within this range, such as for example, from 2.0 to 5.0, or from 2.0 to 4.5, or from 2.0 to 4.0, or from 2.0 to 2.5, or from 2.0 to 3.0.

In an embodiment of the invention, the ethylene copolymer will have a flat comonomer incorporation profile as measured using Gel-Permeation Chromatography with Fourier Transform Infra-Red detection (GPC-FTIR). In an embodiment of the invention, the ethylene copolymer will have a negative (i.e. "normal") comonomer incorporation profile as measured using GPC-FTIR. In an embodiment of the invention, the ethylene copolymer will have an Inverse (i.e. "reverse") or partially inverse comonomer incorporation profile as measured using GPC-FTIR. If the comonomer incorporation decreases with molecular weight, as measured using GPC-FTIR, the distribution is described as "normal" or "negative". If the comonomer Incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

In an embodiment of the invention the ethylene copolymer will has a reversed comonomer incorporation profile as measured using GPC-FTIR.

In an embodiment of the invention, the ethylene copolymer will have a comonomer incorporation profile as determined by GPC-FTIR which satisfies the following condition:

SCB/1000C at MW of 200,000−SCB/1000C at MW of 50,000 is a positive number or greater than 1.0;

where SCB/1000C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition:

$$\text{SCB/1000C at MW of 200,000} - \text{SCB/1000C at MW of 50,000} > 2.0;$$

where SCB/1000C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition:

$$\text{SCB/1000C at MW of 200,000} - \text{SCB/1000C at MW of 50,000} > 5.0;$$

where SCB/1000C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition:

$$\text{SCB/1000C at MW of 200,000} - \text{SCB/1000C at MW of 50,000} > 6.0;$$

where SCB/1000C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer Incorporation profile as determined by GPC-FTIR which satisfies the following condition:

$$\text{SCB/1000C at MW of 200,000} - \text{SCB/1000C at MW of 50,000} > 7.0;$$

where SCB/1000C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a melt flow ratio (the MFR=$I_{21}/I_2$) of from 30 to 60. In further embodiments of the invention, the ethylene copolymer will have an $I_{21}/I_2$ of from 30 to 55, or from 30 to 50, or from 30 to 45, or from 32 to 50 or from 35 to 55, or from 36 to 50, or from 36 to 48, or from 36 to 46, or from 35 to 50, or from greater than 35 to less than 50, or from greater than 35 to 50.

In an embodiment of the invention, the ethylene copolymer has a melt flow ratio ($I_{21}/I_2$) of from 30 to 50. In an embodiment of the invention, the ethylene copolymer has a melt flow ratio ($I_{21}/I_2$) of from greater than 30 to 50. In an embodiment of the invention, the ethylene copolymer has a melt flow ratio ($I_{21}/I_2$) of from 32 to 50. In an embodiment of the invention, the ethylene copolymer has a melt flow ratio ($I_{21}/I_2$) of from 35 to 50. In an embodiment of the Invention, the polyethylene copolymer has a melt flow ratio ($I_{21}/I_2$) of from 36 to 50. In an embodiment of the invention, the polyethylene copolymer has a melt flow ratio ($I_{21}/I_2$) of from 32 to 55. In an embodiment of the invention, the polyethylene copolymer has a melt flow ratio ($I_{21}/I_2$) of from 36 to 55.

In embodiments of the invention, the ethylene copolymer will have a composition distribution breadth index $CDBI_{50}$, as determined by temperature elution fractionation (TREF), of from 35% to 75% by weight, or from 35 to 70 wt %, or from 40% to 75% by weight. In embodiments of the invention, the copolymer will have a $CDBI_{50}$ of from 40% to 70%, or 45% to 70%, or from 45% to 65%, or from 45 to 60%, or from 45% to 69%, or from 50% to 69%, or from 50% to 70%, or from 50% to 66%, or from 50% to 65%, or from 50% to 60%, or from 55% to 70%, or from 55 to 65%, or from 60% to 70%, or from 60% to 65% (by weight).

In an embodiment of the invention, the polyethylene copolymer has a $CDBI_{50}$ of from 35 wt % to 70 wt %. In an embodiment of the invention, the polyethylene copolymer has a $CDBI_{50}$ of from 45 wt % to 69 wt %.

The composition distribution of an ethylene copolymer may also be characterized by the T(75)-T(25) value, where the T(25) is the temperatures at which 25 wt % of the eluted copolymer is obtained, and T(75) is the temperature at which 75 wt % of the eluted copolymer is obtained in a TREF experiment.

In an embodiment of the present invention, the ethylene copolymer will have a T(75)-T(25) of from 10 to 30° C. as determined by TREF. In an embodiment of the present invention, the ethylene copolymer will have a T(75)-T(25) of from 10 to 25° C. as determined by TREF. In an embodiment of the present invention, the ethylene copolymer will have a T(75)-T(25) of from 10 to 22.5° C. as determined by TREF. In an embodiment of the present invention, the ethylene copolymer will have a T(75)-T(25) of from 12.5 to 25° C. as determined by TREF. In an embodiment of the present Invention, the ethylene copolymer will have a T(75)-T(25) of from 12.5 to 22.5° C. as determined by TREF. In an embodiment of the present invention, the ethylene copolymer will have a T(75)-T(25) of from 12.5 to 20.0° C. as determined by TREF. In an embodiment of the present invention, the ethylene copolymer will have a T(75)-T(25) of from 10.0 to 20° C. as determined by TREF.

In embodiments of the invention, the ethylene copolymer will have a CY a-parameter (also called the Carreau-Yasuda shear exponent) of from 0.01 to 0.4, or from 0.05 to 0.4, or from 0.05 to 0.3, or from 0.01 to 0.3, or from 0.01 to 0.25, or from 0.05 to 0.25.

In embodiments of the invention, the ethylene copolymer will have a normalized shear thinning index, SHI @0.1 rad/s (i.e. the $\eta^*_{0.1}/\eta_0$) of from 0.001 to 0.90, or from 0.001 to 0.8, or from 0.001 to 0.5, or less than 0.9, or less than 0.8, or less than 0.5, or less than 0.35.

In an embodiment of the invention, the ethylene copolymer will have a TREF profile, as measured by temperature rising elution fractionation, which is multimodal, comprising at least two elution intensity maxima or peaks.

In an embodiment of the invention, the ethylene copolymer will have an amount of copolymer eluting at a temperature at or below 40° C., of less than 5 wt % as determined by temperature rising elution fractionation (TREF).

In an embodiment of the invention, the ethylene copolymer will have an amount of copolymer eluting at a temperature of from 90° C. to 105° C., of from 5 to 45 wt % as determined by temperature rising elution fractionation (TREF). In an embodiment of the invention, the ethylene copolymer will have an amount of copolymer eluting at a temperature of from 90° C. to 105° C., of from 5 to 40 wt % as determined by temperature rising elution fractionation (TREF). In an embodiment of the invention, the ethylene copolymer will have an amount of copolymer eluting at a temperature of from 90° C. to 105° C., of from 5 to 35 wt % as determined by temperature rising elution fractionation (TREF). In an embodiment of the invention, from 5 to 30 wt % of the ethylene copolymer will be represented within a temperature range of from 90° C. to 105° C. in a TREF profile. In an embodiment of the invention, from 10 to 30 wt % of the ethylene copolymer will be represented within a temperature range of from 90° C. to 105° C. in a TREF profile. In an embodiment of the invention, from 5 to 25 wt % of the ethylene copolymer will be represented within a temperature range of from 90° C. to 105° C. in a TREF profile. In an embodiment of the invention, from 10 to 25 wt % of the ethylene copolymer will be represented within a temperature range of from 90° C. to 105° C. in a TREF profile. In another embodiment of the invention, from 12 to 25 wt % of the ethylene copolymer will be represented at a temperature range of from 90° C. to 105° C. in a TREF profile. In another embodiment of the invention, from 10 to 22.5 wt % of the ethylene copolymer will be represented at a temperature range of from 90° C. to 1050° C. in a TREF profile.

In embodiments of the invention, less than 1 wt %, or less than 0.5 wt %, or less than 0.05 wt %, or 0 wt % of the ethylene copolymer will elute at a temperature of above 100° C. in a TREF analysis.

In an embodiment of the invention, the ethylene copolymer will have a TREF profile, as measured by temperature rising elution fractionation, comprising: i) a multimodal TREF profile comprising at least two elution intensity maxima (or peaks); ii) less than 5 wt % of the copolymer represented at a temperature at or below 40° C.; and iii) from 5 to 40 wt % of the copolymer represented at a temperature of from 90° C. to 105° C.

In an embodiment of the invention, the ethylene copolymer has a trimodal TREF profile comprising three elution intensity maxima (or peaks).

In an embodiment of the invention, the ethylene copolymer has a multimodal TREF profile defined by three elution intensity maxima (or peaks) occurring at elution temperatures T(low), T(medium or "med" for short) and T(high), where T(low) is from 60° C. to 82° C., T(med) is from 75° C. to 90° C. but higher than T(low), and T(high) is from 90° C. to 100° C. but higher than T(low). In an embodiment of the invention, the ethylene copolymer has a multimodal TREF profile defined by three elution intensity maxima (or peaks) occurring at elution temperatures T(low), T(medium or "med" for short) and T(high), where T(low) is from 62° C. to 82° C., T(med) is from 76° C. to 89° C. but higher than T(low), and T(high) is from 90° C. to 100° C. In an embodiment of the invention, the ethylene copolymer has a multimodal TREF profile defined by three intensity peaks occurring at elution temperatures T(low), T(med) and T(high); wherein T(low) occurs at from 64° C. to 82'C, T(med) occurs at from 78'C to 89° C. but is higher than T(low), and T(high) occurs at from 90° C. to 100° C. In an embodiment of the invention, the ethylene copolymer has a multimodal TREF profile defined by three intensity peaks occurring at elution temperatures T(low), T(med) and T(high); wherein T(low) occurs at from 64° C. to 82° C., T(med) occurs at from 78° C. to 87° C. but is higher than T(low), and T(high) occurs at from 90° C. to 96° C. but is higher than T(med).

In an embodiment of the invention, the ethylene copolymer has a multimodal TREF profile defined by three elution intensity maxima (or peaks) occurring at elution temperatures T(low), T(medium or "med" for short) and T(high), where T(low) is from 64° C. to 82° C., T(med) is from 75° C. to 90° C. but is higher than T(low), and T(high) is from 90° C. to 100° C. but is higher than T(med). In an embodiment of the invention, the ethylene copolymer has a multimodal TREF profile defined by three elution intensity maxima (or peaks) occurring at elution temperatures T(low), T(medium or "med" for short) and T(high), where T(low) is from 65° C. to 75° C., T(med) is from 76° C. to 89° C., and T(high) is from 90° C. to 100° C.

In an embodiment of the invention, the ethylene copolymer has a multimodal TREF profile defined by three elution intensity maxima (or peaks) occurring at elution temperatures T(low), T(medium or "med" for short) and T(high), where T(low) is from 65° C. to 75° C., T(med) is from 76° C. to 87° C., and T(high) is from 90° C. to 100° C.

In an embodiment of the invention, the ethylene copolymer has a multimodal TREF profile defined by three elution intensity maxima (or peaks) occurring at elution temperatures T(low), T(medium or "med" for short) and T(high), where T(low) is from 65° C. to 75° C., T(med) is from 75° C. to 85° C. but is higher than T(med), and T(high) is from 90° C. to 100° C.

In an embodiment of the invention, the ethylene copolymer has a multimodal TREF profile defined by three elution intensity maxima (or peaks) occurring at elution temperatures T(low), T(medium or "med" for short) and T(high), where the intensity of the peaks at T(low) and T(high) are greater than the intensity of the peak at T(med).

In embodiments of the invention, the ethylene copolymer has a multimodal TREF profile defined by three elution intensity maxima (or peaks) occurring at elution temperatures T(low), T(medium or "med" for short) and T(high), where T(med)-T(low) is from 3° C. to 25° C., or from 5° C. to 20'C; or from 5° C. to 15° C., or from 7° C. to 15° C.

In embodiments of the Invention, the ethylene copolymer has a multimodal TREF profile defined by three elution intensity maxima (or peaks) occurring at elution temperatures T(low), T(medium or "med" for short) and T(high), where T(high)-T(med) is from 3° C. to 20° C., or from 3° C. to 17° C., or from 3° C. to 15° C., or from 5° C. to 20° C., or from 5° C. to 17° C., or from 5° C. to 15° C., or from 7° C. to 17° C., or from 7° C. to 15° C. or from 10° C. to 17° C., or from 10° C. to 15° C.

In embodiments of the invention, the copolymer has a multimodal TREF profile defined by three elution intensity maxima (or peaks) occurring at elution temperatures T(low), T(medium or "med" for short) and T(high), where T(high)-T(low) is from 15° C. to 35° C., or from 15° C. to 30° C., or from 17° C. to 30° C., or from 15° C. to 27° C., or from 17° C. to 27° C., or from 20° C. to 30° C. or from 20° C. to 27° C.

In an embodiment of the invention, the copolymer has a multimodal TREF profile defined by three elution intensity maxima (or peaks) occurring at elution temperatures T(low), T(medium or "med" for short) and T(high), where the intensity of the peaks at T(low) and T(high) are greater than the intensity of the peak at T(med); and where T(med)-T(low) is from 3° C. to 25° C.; where T(high)-T(med) is from 5° C. to 15° C.; and where T(high)-T(low) is from 15° C. to 35° C.

In an embodiment of the invention, the ethylene copolymer has a multimodal TREF profile defined by three elution intensity maxima (or peaks) occurring at elution temperatures T(low), T(medium or "med" for short) and T(high), where the Intensity of the peaks at T(low) and T(high) are greater than the intensity of the peak at T(med); and where T(med)-T(low) is from 3° C. to 15° C.; where T(high)-T(med) is from 5° C. to 15° C.; and where T(high)-T(low) is from 15° C. to 30° C.

In embodiments of the invention, the ethylene copolymer has a multimodal TREF profile defined by three intensity peaks occurring at elution temperatures T(low), T(med) and T(high), where T(low) is from 64° C. to 82° C., T(med) is from 76° C. to 89° C. but is higher than T(low), and T(high) is from 90° C. to 100° C. and where the intensity of the peak at T(low) and T(high) is greater than the intensity of the peak at T(med); and where T(med)-T(low) is from 3° C. to 25° C., or from 5° C. to 20'C; or from 5° C. to 15° C., or from 7° C. to 15° C.

In embodiments of the invention, the ethylene copolymer has a multimodal TREF profile defined by three intensity peaks occurring at elution temperatures T(low), T(med) and T(high), where T(low) is from 64° C. to 75° C., T(med) is from 76° C. to 86° C., and T(high) is from 90° C. to 100° C. and where the intensity of the peak at T(low) and T(high) is greater than the intensity of the peak at T(med); and where T(med)-T(low) is from 3° C. to 25° C., or from 5° C. to 20° C.; or from 5° C. to 15° C., or from 7° C. to 15'C.

In embodiments of the Invention, the ethylene copolymer has a multimodal TREF profile defined by three intensity peaks occurring at elution temperatures T(low), T(med) and T(high), where T(low) is from 64° to 82° C., T(med) is from 76° C. to 89° C. but is higher than T(low), and T(high) is from 90° C. to 100° C. and where the intensity of the peak at T(low) and T(high) is greater than the intensity of the peak at T(med); and where T(high)-T(med) is from is from 3° C. to 20° C., or from 3° C. to 17° C., or from 3° C. to 15° C., or from 5° C. to 20° C., or from 5° C. to 17° C., or from 5° C. to 15° C., or from 7° C. to 17° C., or from 7° C. to 15° C. or from 10° C. to 17° C., or from 10° C. to 15° C.

In embodiments of the invention, the ethylene copolymer has a multimodal TREF profile defined by three intensity peaks occurring at elution temperatures T(low), T(med) and T(high), where T(low) is from 64° C. to 75° C., T(med) is from 76° C. to 86° C., and T(high) is from 90° C. to 100° C. and where the intensity of the peak at T(low) and T(high) is greater than the Intensity of the peak at T(med); and where T(high)-T(med) is from 3° C. to 20° C., or from 3° C. to 17° C., or from 3° C. to 15° C., or from 5° C. to 20° C., or from 5° C. to 17° C., or from 5° C. to 15° C., or from 7° C. to 17° C., or from 7° C. to 15° C. or from 10° C. to 17° C., or from 10° C. to 15° C.

In embodiments of the invention, the ethylene copolymer has a multimodal TREF profile defined by three intensity peaks occurring at elution temperatures T(low), T(med) and T(high), where T(low) is from 64° C. to 82° C., T(med) is from 76° C. to 89° C. but is higher than T(low), and T(high) is from 90° C. to 100° C. and where the Intensity of the peak at T(low) and T(high) is greater than the intensity of the peak at T(med); and where T(high)-T(low) is from 15° C. to 35° C., or from 15° C. to 30° C., or from 17° C. to 30° C., or from 15° C. to 27° C., or from 17° C. to 27° C., or from 20° C. to 30° C. or from 20° C. to 27° C.

In embodiments of the invention, the ethylene copolymer has a multimodal TREF profile defined by three intensity peaks occurring at elution temperatures T(low), T(med) and T(high), where T(low) is from 65° C. to 75° C., T(med) is from 76° C. to 86° C., and T(high) is from 90° C. to 100° C. and where the intensity of the peak at T(low) and T(high) is greater than the intensity of the peak at T(med); and where T(high)-T(low) is from 15° C. to 35° C., or from 15° C. to 30° C., or from 17° C. to 30° C., or from 15° C. to 27° C., or from 17° C. to 27° C., or from 20° C. to 30° C. or from 20'C to 27° C.

In an embodiment of the invention, the ethylene copolymer has two melting peaks as measured by differential scanning calorimetery (DSC).

In an embodiment of the invention, the ethylene copolymer will satisfy the condition:

$$(CDBI_{50}-3) \le [15/(a+0.12)];$$

where the $CDBI_{50}$ is the composition distribution breadth index in wt %, determined by TREF analysis and "a" is the is the Carreau-Yasuda shear exponent determined by dynamic mechanical analysis (DMA).

In embodiments of the invention, the ethylene copolymer will have a hexane extractables level of ≤3.0 wt %, or ≤2.0 wt %, or ≤1.5 wt % or≤1.0 wt %. In an embodiment of the invention, the copolymer has a hexane extractables level of from 0.2 to 3.0 wt %, or from 0.2 to 2.5 wt %, or from 0.2 to 2.0 wt %.

In an embodiment of the invention, the ethylene copolymer will have a processability enhancement index ($\chi$) of at least 1.0, where the processability enhancement index ($\chi$) is defined by:

$$\chi = 96 - 2.14[(MFR^{0.5}) + 1 \times 10^{-4}(M_w - M_n)]/\delta^{xo}$$

where $\delta^{xo}$ is the crossover phase angle from a van Gurp-Palmen (VGP) plot as determined by dynamic mechanical analysis (DMA), MFR is the melt flow ratio $I_{21}/I_2$, $M_w$ is the weight average molecular weight and $M_n$ is the number average molecular weight determined by gel permeation chromatography (GPC).

In an embodiment of the invention, the ethylene copolymer will have processability enhancement index ($\chi$) of greater than 1.0 and less than 1.50.

In an embodiment of the invention, the ethylene copolymer will have processability enhancement index ($\chi$) of greater than 1.0 and less than 1.30.

In an embodiment of the invention, the ethylene copolymer will have processability enhancement index ($\chi$) of greater than 1.0 and less than 1.20.

In an embodiment of the invention, the ethylene copolymer will satisfy the condition:

$$\delta^{xo} \le 96 - 2.14[(MFR^{0.5}) + 1 \times 10^{-4}(M_w - M_n)]$$

where $\delta^{xo}$ is the crossover phase angle at a frequency of 1.0 rad/s in a VGP plot as determined by dynamical mechanical analysis (DMA), MFR is the melt flow ratio $I_{21}/I_2$, $M_w$ is the weight average molecular weight and Mn is the number average molecular weight determined by gel permeation chromatography (GPC).

In an embodiment of the invention, the ethylene copolymer satisfies the following relationship: $(M_w/M_n) \ge 68 [(I_{21}/I_2)^{-1} + 10^{-6}(M_n)]$.

In an embodiment of the Invention, the ethylene copolymer satisfies the following relationship: $\delta^{xo} \le [80 - 1.22 (CDBI_{50})/(M_w/M_n)]$, where $\delta^{xo}$ is the crossover phase angle from a van Gurp-Palmen (VGP) plot as determined by dynamic mechanical analysis (DMA) and $CDBI_{50}$ is the comonomer distribution breadth index as determined by TREF analysis.

In an embodiment of the invention, the ethylene copolymer satisfies both of the following relationships: $(M_w/M_n) \ge 68 [(I_{21}/I_2)^{-1} + 10^{-6}(M_n)]$ and $\delta^{xo} \le [80 - 1.22 (CDBI_{50})/(M_w/M_n)]$.

Film Production

The extrusion-blown film process is a well-known process for the preparation of plastic film. The process employs an extruder which heats, melts and conveys the molten plastic and forces it through an annular die. Typical extrusion temperatures are from 330 to 500° F., especially 350 to 460° F.

The polyethylene copolymer film is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation (in both the machine direction and the axial or cross direction).

A balance of "machine direction" ("MD") and "transverse direction" ("TD"—which is perpendicular to MD) molecular orientation is generally considered desirable for the films associated with the invention (for example, Dart Impact strength, Machine Direction and Transverse Direction tear properties may be affected).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together.

In an embodiment of the invention, the films of this invention are prepared using the above described blown film process.

An alternative process is the so-called cast film process, wherein the polyethylene is melted in an extruder, then forced through a linear slit die, thereby "casting" a thin flat film. The extrusion temperature for cast film is typically somewhat hotter than that used in the blown film process (with typically operating temperatures of from 450 to 550° F.). In general, cast film is cooled (quenched) more rapidly than blown film.

In an embodiment of the invention, the films of this invention are prepared using a cast film process.

Additives

The ethylene copolymer composition used in the current invention to make films, may also contain additives, such as for example, primary antioxidants (such as hindered phenols, including vitamin E); secondary antioxidants (especially phosphites and phosphonites); nucleating agents, plasticizers or polymer processing aids PPAs (e.g. fluoroelastomer and/or polyethylene glycol bound process aid), acid scavengers, stabilizers, anticorrosion agents, blowing agents, other ultraviolet light absorbers such as chain-breaking antioxidants, etc., quenchers, antistatic agents, slip agents, anti-blocking agent, pigments, dyes and fillers and cure agents such as peroxide.

These and other common additives in the polyolefin industry may be present in copolymer compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In an embodiment of the invention, antioxidants and stabilizers such as organic phosphites and phenolic antioxidants may be present in the copolymer compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and tris (nonyl phenyl)phosphite (WESTON 399). Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present in the ethylene copolymer composition from 0.1 to 50 wt % in one embodiment, and from 0.1 to 25 wt % of the composition in another embodiment, and from 0.2 to 10 wt % in yet another embodiment Fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, days, alumina, and other metal oxides and carbonates, metal hydroxides, chrome, phosphorous and brominated flame retardants, antimony trioxide, silica, silicone, and blends thereof. These fillers may include any other fillers and porous fillers and supports which are known in the art.

Fatty acid salts may also be present in the copolymer compositions. Such salts may be present from 0.001 to 2 wt % of the copolymer composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of the ethylene copolymer and one or more additives, sufficient mixing should take place to assure that a uniform blend will be produced prior to conversion into a finished product. The copolymer can be in any physical form when used to blend with the one or more additives. In one embodiment, reactor granules, defined as the granules of polymer that are isolated from the polymerization reactor, are used to blend with the additives. The reactor granules have an average diameter of from 10 μm to 5 mm, and from 50 μm to 10 mm in another embodiment. Alternately, the ethylene copolymer is in the form of pellets, such as, for example, having an average diameter of from 1 mm to 6 mm that are formed from melt extrusion of the reactor granules.

One method of blending the additives with the ethylene copolymer is to contact the components in a tumbler or other physical blending means, the copolymer being in the form of reactor granules. This can then be followed, if desired, by melt blending in an extruder. Another method of blending the components is to melt blend the copolymer pellets with the additives directly in an extruder, or any other melt blending means.

Film Properties.

The film, or film layer of the present invention are made from the ethylene copolymers defined as above. Generally, an additive as described above is mixed with the ethylene copolymer prior to film production. The ethylene copolymers and films have a balance of processing and mechanical properties. Accordingly, the films of the present invention will have a dart Impact strength of ≥500 g/mil, a 1% MD secant modulus of greater than 150 MPa, and a 1% TD secant modulus of greater than 170 MPa in combination with good film processing output rates.

In embodiments of the invention, the film will have a dart impact of ≥500 g/mil, or ≥550 g/mil, or ≥600 g/mil. In another embodiment of the invention, the film will have a dart impact of from 500 g/mil to 750 g/mil. In a further embodiment of the invention, the film will have dart impact of from 500 g/mil to 700 g/mil. In yet another embodiment of the invention, the film will have dart impact of from 550 g/mil to 750 g/mil. In still yet another embodiment of the invention, the film will have dart impact of from 600 g/mil to 750 g/mil. In a further embodiment of the invention, the film will have dart impact of from 600 g/mil to 700 g/mil. In a further embodiment of the invention, the film will have dart impact of from 550 g/mil to 700 g/mil.

In embodiments of the invention, the film will have a ratio of MD tear to TD tear (MD tear/TD tear) of less than 0.75, or ≤0.70, or ≤0.60, or ≤0.50, or ≤0.40, or ≤0.45; or ≤0.35. In another embodiment of the invention, the film will have a ratio of MD tear to TD tear of from 0.10 to 0.75. In yet another embodiment of the invention, the film will have a ratio of MD tear to TD tear of from 0.1 to 0.6. In still another embodiment of the invention, the film will have a ratio of MD tear to TD tear of from 0.2 to 0.55. In still yet embodiment of the invention, the film will have a ratio of MD tear to TD tear of from 0.2 to 0.50.

In embodiments of the invention, a 1 mil film will have a machine direction (MD) secant modulus at 1% strain of ≥150 MPa, or ≥160 MPa, or ≥175 MPa, or ω180 MPa≥190 MPa. In an embodiment of the invention, a 1 mil film will have a machine direction (MD) secant modulus at 1% strain of from 150 MPa to 250 MPa. In an embodiment of the invention, a 1 mil film will have a machine direction (MD) secant modulus at 1% strain of from 160 MPa to 240 MPa. In another embodiment of the invention, a 1 mil film will have a machine direction (MD) secant modulus at 1% strain of from 170 MPa to 230 MPa. In yet another embodiment of the invention, a 1 mil film will have a machine direction (MD) secant modulus at 1% strain of from 180 MPa to 220 MPa.

In an embodiment of the invention, a 1 mil film will have a transverse direction (TD) secant modulus at 1% strain of ≥170 MPa, or ≥175 MPa, or ≥180 MPa, or ≥190 MPa, or ≥200 MPa. In an embodiment of the invention, a 1 mil film will have a transverse direction (TD) secant modulus at 1% strain of from 170 MPa to 270 MPa. In another embodiment of the invention, a 1 mil film will have a transverse direction (TD) secant modulus at 1% strain of from 180 MPa to 260 MPa. In yet another embodiment of the invention, a 1 mil film will have a transverse direction (TD) secant modulus at 1% strain of from 190 MPa to 250 MPa. In another embodiment of the invention, a 1 mil film will have a transverse direction (TD) secant modulus at 1% strain of from 200 MPa to 240 MPa.

The film or film layer may, by way of example, have a total thickness ranging from 0.5 mils to 4 mils (note: 1 mil=0.0254 mm), which will depend on for example the die gap employed during film casting or film blowing.

The above description applies to monolayer films. However, the film of the current invention may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The film of the current invention may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film (for example, as used in the production of produce packaging). The phrase "sealant layer" refers to a film that is Involved in the sealing of the film to itself or to another layer in a multilayer film. A "tie layer" refers to any internal layer that adheres two layers to one another.

By way of example only, the thickness of the multilayer films can be from about 0.5 mil to about 10 mil total thickness.

EXAMPLES

General

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v15, p. 1518 or used directly after being stored over activated 4 Å molecular sieves. The methylaluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen.

Melt index, $I_2$, in g/10 min was determined on a Tinius Olsen Plastomer (Model MP993) in accordance with ASTM D1238 Procedure A (Manual Operation) at 190° C. with a 2.16 kilogram weight. Melt index, $I_{10}$, was determined in accordance with ASTM D1238 Procedure A at 190° C. with a 10 kilogram weight. High load melt index, $I_{21}$, in g/10 min was determined in accordance with ASTM D1238 Procedure A at 190° C. with a 21.6 kilogram weight. Melt flow ratio (also sometimes called melt index ratio) is $I_{21}/I_2$.

Polymer density was determined in grams per cubic centimeter (g/cc) according to ASTM D1928.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Hexane extractables using compression molded plaques were determined according to ASTM D5227.

To determine the composition distribution breadth index $CDBI_{50}$ (which is also designated CDBI(50) in the present invention so that $CDBI_{50}$ and CDBI(50) are used interchangeably), a solubility distribution curve is first generated for the copolymer. This is accomplished using data acquired from the TREF technique (see below). This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median (see WO 93/03093 for the definition of $CDBI_{50}$). The weight percentage of copolymer eluting at from 90-105° C., is determined by calculating the area under the TREF curve at an elution temperature of from 90 to 105° C. The weight percent of copolymer eluting below at or 40° C. and above 100° C. was determined similarly. For the purpose of simplifying the correlation of composition with elution temperature, all fractions are assumed to have a Mn≥15,000, where Mn is the number average molecular weight of the fraction. Any low weight fractions present generally represent a trivial portion of the polymer. The remainder of this description and the appended claims maintain this convention of assuming all fractions have Mn≥15,000 in the $CDBI_{50}$ measurement.

The specific temperature rising elution fractionation (TREF) method used herein was as follows. Homogeneous polymer samples (pelletized, 50 to 150 mg) were introduced into the reactor vessel of a crystallization-TREF unit (Polymer ChAR™). The reactor vessel was filled with 20 to 40 mL 1,2,4-trichlorobenzene (TCB), and heated to the desired dissolution temperature (e.g. 150° C.) for 1 to 3 hours. The solution (0.5 to 1.5 mL) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30=C for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedures described above are well known to persons skilled in the art and can be used to determine the modality of a TREF profile, a $CDBI_{50}$, a copolymer wt % eluting at or below 40° C., a copolymer wt % eluting at above 100° C., a copolymer wt % eluting at from 90° C. to 105° C., a T(75)-T(25) value, as well as the temperatures or temperature ranges where elution intensity maxima (elution peaks) occur.

The melting points including a peak melting point (Tm) and the percent crystallinity of the copolymers are determined by using a TA Instrument DSC Q1000 Thermal Analyzer at 10° C./min. In a DSC measurement, a heating-cooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

The melt strength of a polymer is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min² or 65 t 15 m/min². A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Dynamic Mechanical Analysis (DMA). Dynamic Mechanical Analysis (DMA). Rheological measurements (e.g. small-strain (10%) oscillatory shear measurements) were carded out on a dynamic Rheometrics SR5 Stress rotational rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G"), phase angle (δ), complex modulus (G*) and complex viscosity (η*).

The complex viscosity |η*(ω)| versus frequency (ω) data were then curve fitted using the modified three parameter Carreau-Yasuda (CY) empirical model to obtain the zero shear viscosity $\eta_0$, characteristic viscous relaxation time $\tau_\eta$, and the breadth of rheology parameter-a. The simplified Carreau-Yasuda (CY) empirical model used is as follows:

$$|\eta^*(\omega)|=\eta_0/[1+(\tau_\eta\omega)^a]^{(1-n)/a}$$

wherein: |η*(ω)|=magnitude of complex shear viscosity; $\eta_0$=zero shear viscosity; $\tau_\eta$=characteristic relaxation time; a="breadth" of rheology parameter (which is also called the "Carreau-Yasuda shear exponent" or the "CY a-parameter" or simply the "a-parameter" in the current invention); n=fixes the final power law slope, fixed at 2/11; and ω=angular frequency of oscillatory shearing deformation. Details of the significance and Interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, *Fluid Mechanics*, 2nd Edition, John Wiley & Sons (1987); each of which is incorporated herein by reference in its entirety.

The Shear Thinning Index (SHI) was determined according to the method provided in U.S. Pat. Appl. No. 2011/0212315: the SHI is defined as SHI($\omega$)=$\eta$*($\omega$)/$\eta$0 for any given frequency ($\omega$) for dynamic viscosity measurement, wherein $\eta$0 is zero shear viscosity @190° C. determined via the empiric Cox-Merz-rule. $\eta$* is the complex viscosity @190° C. determinable upon dynamic (sinusoidal) shearing or deformation of a copolymer as determined on a Rheometrics SR5 Stress rotational rheometer using parallel-plate geometry. According to the Cox-Merz-Rule, when the frequency ($\omega$) is expressed in Radiant units, at low shear rates, the numerical value of $\eta$* is equal to that of conventional, intrinsic viscosity based on low shear capillary measurements. The skilled person in the field of rheology is well versed with determining $\eta$0 in this way.

The films of the current examples were made on a blown film line manufactured by Battenfeld Gloucester Engineering Company of Gloucester, Mass. using a die diameter of 4 inches, and a die gap of 35 or 100 mil (note: a fluoroelastomer type PPA was added to inv. resin 1 for purposes of film production; analysis of competitive resin 2 shows that ca. 250-300 ppm of a fluoroelatomer PPA is present; analysis of competitive resin 3 suggests ca. 600 ppm of carbowax and fluoroelatomer PPA in total is present). This blown film line has a standard output of more than 100 pounds per hour and is equipped with a 50 horsepower motor. Screw speed was 35 to 50 RPM. The extender screw has a 2.5 mil diameter and a length/diameter (L/D) ratio of 24/1. Melt Temperature and Frost Line Height (FLH) are 420 to 430° F. and 16 inches respectively. The blown film bubble is air cooled. Typical blow up ratio (BUR) for blown films prepared on this line are from 1.5/1 to 4/1. An annular die having a gap of 85 mils was used for these experiments. The films of this example were prepared using a BUR aiming point of 2.5:1 and a film thickness aiming point of 1.0 mils.

The haze (%) was measured in accordance with the procedures specified in ASTM D 1003-07, using a BYK-Gardner Haze Meter (Model Haze-gard plus).

Dart impact strength was measured on a dart Impact tester (Model D2085AB/P) made by Kayeness Inc. in accordance with ASTM D-1709-04 (method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT(HIGH)-500N-192) in accordance with ASTM D-5748

MD or TD secant modulus was measured on an Instrument 5-Head Universal Tester (Model TTC-102) at a crosshead speed of 0.2 In/min up to 10% strain in accordance with ASTM D-882-10. The MD or TD secant modulus was determined by an initial slope of the stress-strain curve from an origin to 1% strain.

Film tensile testing was conducted on an Instrument 5-Head Universal Tester (Model TTC-102) in accordance with ASTM D-882-10.

Gloss was measured on a BYK-Gardner 45° Micro-Gloss unit in accordance with ASTM D2457-03.

A seal was prepared by clamping two 2.0 mil film strips between heated upper and lower seal bars on a SL-5 Sealer made by Lako Tool for 0.5 seconds, 40 psi seal bar clamping pressure for each temperature in the range from onset of seal to melt through. Seal strength or sealability parameter was measured as a function of seal temperature on an Instrument 5-Head Universal Tester (Model TTC-102) in accordance with ASTM F88-09.

Inventive Example 1

Catalyst System Preparation

Synthesis of (1-$C_6F_5CH_2$-Indenyl)((t-Bu)$_3$P=N)TiCl$_2$

To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford 1-$C_6F_5CH_2$-indene (13.58 g, 88%). To a stirred slurry of TiCl$_4$.2THF (1.72 g, 5.15 mmol) in toluene (15 mL) was added solid (t-Bu)$_3$P=N—Li (1.12 g, 5 mmol) at room temperature. The resulting reaction mixture was heated at 100° C. for 30 min and then allowed to cool to room temperature. This mixture containing ((t-Bu)$_3$P=N)TiCl$_3$ (1.85 g, 5 mmol) was used in the next reaction. To a THF solution (10 mL) of 1-$C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-$C_6F_5CH_2$-Indenyl)((t-Bu)$_3$P=N)TiCl$_2$ (2.35 g, 74%).

Drying of the Catalyst Modifier.

950 g of commercially available Armostat® 1800 (mp 50° C., bp>300° C.), which was used as a catalyst modifier, was loaded in a 2 L-round bottom flask and melted in an oil bath at 80° C. The oil bath temperature was then raised to 110° C. and a high vacuum was applied while maintaining stirring. At first, a lot of bubbles were seen due to the release of gas and moisture vapor. Approximately two hours later, gas evolution subsided and heating/evacuation was continued for another hour. The Armostat 1800 material was then cooled down to room temperature and stored under nitrogen atmosphere until use.

To determine the level of moisture in the Armostat 1800, a 15 wt % of an Armostat solution in pre-dried toluene was prepared and the moisture of the solution was determined by Karl-Fischer titration method. The moisture levels in Armostat 1800 as received from the commercial supplier, as well as that dried by traditional methods (i.e. drying the solution over molecular sieves) and by use of low pressure water distillation was determined. The unpurified catalyst modifier was found to make a 15 wt % toluene solution having 138 ppm of $H_2O$. The catalyst modifier which was dried over molecular sieves was found to make a 15 wt % toluene solution having 15-20 ppm of $H_2O$. The catalyst modifier which was dried by vacuum distillation of water was found to make a 15 wt % toluene solution having 14-16 ppm of $H_2O$. It has thus been shown, that simple vacuum distillation to remove water is as effective as drying methods which employ molecular sieves. In fact, the vacuum distillation has an advantage over use of molecular sieves as a drying agent in that it is far less time consuming (molecular sieves took over 2 days to dry the catalyst modifier sufficiently and multiple batches of the sieves were needed), and more cost effective (the use of sieves led to a decrease in the concentration of the catalyst modifier in toluene solution due to catalyst modifier absorption into the sieves, and required large quantities of solvent to sufficiently solubilize the catalyst modifier in order to make efficient contact with the sieves).

Preparation of Supported Catalyst.

Sylopol 2408 silica purchased from Grace Davison was calcined by fluidizing with air at 200° C. for 2 hours and subsequently with nitrogen at 600° C. for 6 hours. 114.273 grams of the calcined silica was added to 620 mL of toluene. 312.993 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 2.742 grams of $(1-C_6F_5CH_2-Indenyl)((t-Bu)_3P=N)TiCl_2$ (prepared as above in Example 1) was weighed into a 500-mL Pyrex bottle and 300 mL of toluene added. The metal complex solution was added to the silica slurry quantitatively. The resulting slurry was stirred for 2 hours at ambient temperature. 21.958 g of 18.55 wt % toluene solution of Armostat® 1800 was weighed into a small vessel and transferred quantitatively to the silica slurry. The resulting mixture was stirred for a further 30 minutes after which the slurry was filtered, yielding a clear filtrate. The solid component was washed with toluene (2×150 mL) and then with pentane (2×150 mL). The final product was dried in vacuo to between 450 and 200 mtorr and stored under nitrogen until used. The finished catalyst had a pale yellow to pale orange colour. The catalyst had 2.7 wt % of Armostat present.

Polymerization

Continuous ethylene/1-hexene gas phase copolymerization experiments were conducted in a 56.4 L Technical Scale Reactor (TSR) in continuous gas phase operation (for an example of a TSR reactor set up see Eur. Pat. Appl. No. 659,773A1). Ethylene polymerizations were run at 75° C.-90° C. with a total operating pressure of 300 pounds per square inch gauge (psig). Gas phase compositions for ethylene and 1-hexene were controlled via closed-loop process control to values of 65.0 and 0.5-2.0 mole %, respectively. Hydrogen was metered into the reactor in a molar feed ratio of 0.0008-0.0015 relative to ethylene feed during polymerization. Nitrogen constituted the remainder of the gas phase mixture (approximately 38 mole %). A typical production rate for these conditions is 2.0 to 3.0 kg of polyethylene per hour. A seed-bed was used and prior to polymerization start-up was washed with a small amount of triethylaluminum, TEAL to scavenge impurities. Prior to introduction of the catalyst TEAL was flushed from the reactor. The catalyst was fed to the reactor together with small amount of dilute TEAL solution (0.25 wt %) during the start-up phase. The addition of TEAL was discontinued once the desired polymer production rate was reached. Alternatively, the reactor can be started with the catalyst feed line alone during the polymerization start-up phase (that is, without initially feeding the TEAL solution). The polymerization reaction was initiated under conditions of low comonomer concentration, followed by gradual adjustment of the comonomer to ethylene ratio to provide the targeted polymer density. Steady state polymerization conditions are provided in Table 1. Polymer data for the resulting inventive resin 1 are provided in Table 2 (C2=ethylene; C6=1-hexene; C6/C2 is the molar feed ratio of each component to the reactor). Film data for inventive film 1 made from inventive resin 1 are provided in Table 3.

Comparative Example 1

Catalyst System Preparation

The phosphinimine catalyst compound $(1,2-(n-propyl)(C_6F_5)Cp)Ti(N=P(t-Bu)_3)Cl_2$ was made in a manner similar to the procedure given in U.S. Pat. No. 7,531,602 (see Example 2).

Preparation of the Supported Catalyst.

To a slurry of dehydrated silica (122.42 g) in toluene (490 mL) was added a 10 wt % MAO solution (233.84 g of 4.5 wt % Al in toluene) over 10 minutes. The vessel containing the MAO was rinsed with toluene (2×10 mL) and added to the reaction mixture. The resultant slurry was stirred with an overhead stirrer assembly (200 rpm) for 1 hour at ambient temperature. To this slurry was added a toluene (46 mL) solution of $(1,2-(n-propyl)(C_6F_5)Cp)Ti(N=P(t-Bu)_3)Cl_2$ (2.28 g) over 10 minutes. This solution may need to be gently heated to 45° C. for a brief period (5 minutes) to fully dissolve the molecule. The vessel containing the molecule was rinsed with toluene (2×10 mL) and added to the reaction mixture. After stirring for 2 hours (200 rpm) at ambient temperature a toluene (22 mL) solution of Armostat-1800 (which was previously dried according to the method above for "Drying a Catalyst Modifier") at 8.55 wt % was added to the slurry which was further stirred for 30 minutes. The slurry was filtered and rinsed with toluene (2×100 mL) and then with pentane (2×100 mL). The catalyst was dried in vacuo to less than 1.5 wt % residual volatiles. The solid catalyst was isolated and stored under nitrogen until further use. The catalyst had 2.7 wt % of Armostat present.

Polymerization

Continuous ethylene/1-hexene gas phase copolymerization experiments were conducted in a 56.4 L Technical Scale Reactor (TSR) in continuous gas phase operation. Ethylene polymerizations were run at 75° C.-90° C. with a total operating pressure of 300 pounds per square inch gauge (psig). Gas phase compositions for ethylene and 1-hexene were controlled via closed-loop process control to values of 65.0 and 0.5-2.0 mole %, respectively. Hydrogen was metered into the reactor in a molar feed ratio of 0.0008-0.0015 relative to ethylene feed during polymerization. Nitrogen constituted the remainder of the gas phase mixture (approximately 38 mole %). A typical production rate for these conditions is 2.0 to 3.0 kg of polyethylene per hour. Relevant polymerization data are provided in Table 1. Polymer data for the resulting comparative resin 1 are provided in Table 2. Film data for comparative film 1 made from comparative resin 1 are provided in Table 3.

TABLE 1

TSR Conditions

| Catalyst | Inv. 1 | Comp. 1 |
|---|---|---|
| Productivity (g PE/g Cat) | 3400 | 7700 |
| Hydrogen (mol %) | 0.0350 | 0.0298 |
| Hexene (mol %) | 0.8603 | 1.2110 |
| C6/C2 (mol/mol feed) | 0.0232 | 0.0215 |
| Temp (° C.) | 80 | 85 |

TABLE 1-continued

| TSR Conditions | | |
|---|---|---|
| Catalyst | Inv. 1 | Comp. 1 |
| Production rate (kg/hr) | 2.58 | 2.53 |
| Residence Time (hrs) | 1.81 | 1.62 |
| Bulk Density (lb per cubic foot) | 22.5 | 17.9 |

Also included in Table 2 are comparative resins 2-7. Corresponding film properties for comparative resins 2-4 are given in Table 3. Comparative resin 2 is an Exceed 1018™ ethylene copolymer of 1-hexene, which is commercially available from ExxonMobil. Comparative resin 3 is believed to be a resin representative of Enable 20-05™ which is commercially available from ExxonMobil. Comparative resin 4 is a melt blend of FP-019C and LF-Y819-A. LF-Y819 represents 5% by weight of the melt blend. Y819-A, is a high pressure low density material having a melt index of 0.75 g/10 min and a density of 0.919 g/cc, available from NOVA Chemicals. FPs-019-C is a linear low density material having a melt index of 0.8 g/10 min and a density of 0.918 g/cc, made using a Ziegler-Natta catalyst, also available form NOVA Chemicals. Comparative Resins 5 and 6 are ELITE 5100G™ and ELITE 5400G™ respectively which are made using a dual reactor solution process with a mixed catalyst system and are commercially available from the Dow Chemical Company. Comparative resin 7 is DOWLEX 2045G™, which is made with a Ziegler-Natta catalyst in a solution reactor, and is also commercially available from the Dow Chemical Company.

TABLE 2

Copolymer Properties

| Copolymer No. | Inv. 1 | Comp. 1 | Comp. 2 | Comp. 3 | Comp. 4 | Comp. 5 | Comp. 6 | Comp. 7 |
|---|---|---|---|---|---|---|---|---|
| density (g/cc) | 0.9208 | 0.9171 | 0.9189 | 0.9203 | 0.9192 | 0.9204 | 0.9164 | 0.9182 |
| MI, $I_2$ (g/10 min) | 0.60 | 0.90 | 1.0 | 0.47 | 0.67 | 0.82 | 1.00 | 0.98 |
| MFR, $I_{21}/I_2$ | 44.5 | 16.0 | 16.2 | 41.2 | 32.1 | 24 | 32.0 | 28.2 |
| $I_{10}/I_2$ | 10.9 | 5.76 | 5.76 | 10.8 | 8.7 | 7.08 | 8.55 | 7.97 |
| Comonomer | 1-hexene | 1-hexene | 1-hexene | 1-hexene | 1-hexene | 1-octene | 1-octene | 1-octene |
| TREF profile | trimodal T (low) = 71.5° C. T(med) = 81.3° C. T (high) = 92.3° C. | bimodal T (low) = 80.8° C. T (high) = 91.6° C. | bimodal T (low) = 81.4° C. T (high) = 92.9° C. | single peak at T = 81.5° C. | bimodal T (low) = 77.4° C. T (high) = 94.6° C. | trimodal T (low) = 66.8° C. T (med) = 84.3° C. T (high) = 95.4° C. | trimodal T (low) = 66.1° C. T (med) = 83.5° C. T (high) = 94.6° C. | bimodal T (low) = 80.0° C. T (high) = 93.8° C. |
| T(med)-T(low), ° C. | 9.8 | NA | NA | NA | NA | 17.5 | 17.4 | NA |
| T(high)-T(med), ° C. | 11.0 | NA | NA | NA | NA | 11.1 | 11.1 | NA |
| T(high)-T(low), ° C. | 20.8 | 10.8 | 11.5 | NA | 17.2 | 28.6 | 28.5 | 13.8 |
| wt % at 90-105° C. | 12.2 | 10.8 | 10.9 | 0.6 | 13.7 | 23.3 | 14.7 | 18.2 |
| T (75)-T (25) (° C.) | 14.6 | 9.3 | 10.0 | 4.8 | 16.0 | 23.3 | 20.1 | 15.7 |
| $CDBI_{50}$ (wt %) | 65.6 | 75.5 | 70.8 | 86.8 | 58.2 | 35.2 | 55.7 | 54.4 |
| comonomer profile | reverse | slightly reverse | reverse | appox. flat | negative | reverse | reverse | normal |
| DSC melt temp (° C.) | 104.2, 120.3 | 108.3, 116.9 | 107.9, 118.8 | 111.7 | 107.8, 119.5 | 94.5, 124.4 | 100.5, 117.9, 122.5 | 109.9, 118.4, 121.8 |
| % crystallinity | 46.1 | 43.7 | 45.1 | 43.8 | 42.4 | 46.2 | 41.9 | 43.1 |
| CY a-parameter | 0.0947 | 0.7314 | 0.7266 | 0.0616 | — | 0.4239 | 0.2666 | 0.4229 |
| $M_w$ (× $10^{-3}$) | 97.3 | 105.3 | 103.8 | 96 | 115.3 | 99.5 | 94.4 | 94.0 |
| $M_n$ (× $10^{-3}$) | 20.3 | 59.6 | 53.1 | 31.4 | 42.1 | 39.9 | 36.5 | 26.7 |
| $M_z$ (× $10^{-3}$) | 226.4 | 167.4 | 167.4 | 193 | 421 | 196.1 | 192.2 | 24.5 |
| $M_w/M_n$ | 4.78 | 1.77 | 1.96 | 3.05 | 2.74 | 2.49 | 2.59 | 3.52 |
| $M_z/M_w$ | 2.33 | 1.59 | 1.61 | 2.0 | 3.65 | 1.97 | 2.03 | 2.61 |
| C6 content (wt %) | 7.3 | 5.9 | 6.3 | 6.5 | — | 2.6 | 11.1 | 9.8 |
| SCB/1000 C | 12.7 | 10.2 | 10.9 | 11.3 | — | 3.3 | 15.2 | 13.2 |
| hexane extractables (%) | 0.94 | 0.18 | 0.32 | 0.39 | — | 0.32 | 0.52 | 0.64 |
| melt strength (cN) | 5.74 | 3.43 | 2.56 | 5.93 | — | 3.29 | 4.14 | 3.24 |
| processability enhancement index ($\chi$) | 1.10 | 0.94 | 0.91 | 1.26 | — | 0.95 | 1.01 | 0.95 |
| VGP crossover phase angle ($\sigma^{xo}$) | 59.6 | 82.1 | 84.2 | 54.3 | — | 76.65 | 70.81 | 73.97 |
| 96 − 2.14 $[(MFR^{0.5}) + 1 \times 10^4 (M_w - M_n)]$ | 65.3 | 77.5 | 76.5 | 68.4 | 68.3 | 72.75 | 71.48 | 70.23 |
| SCB/1000C at MW of 200,000-SCB/1000C | 6.1 | 1.9 | 1.6 | −0.2 (or <0) | — | 3.9 | 4.0 | −2.2 |

TABLE 2-continued

Copolymer Properties

| Copolymer No. | Inv. 1 | Comp. 1 | Comp. 2 | Comp. 3 | Comp. 4 | Comp. 5 | Comp. 6 | Comp. 7 |
|---|---|---|---|---|---|---|---|---|
| at MW of 50,000 | | | | | | | | |
| Shear Thinning Index (SHI) | 0.01 | 0.99 | 0.99 | <0.01 | — | 0.87 | 0.60 | 0.84 |
| $(CDBI_{50} - 3) \leq [15/(a + 0.12)]$ | Yes 62.6<69.8 | No 72.5>17.6 | No 67.8>17.7 | No 83.8>82.6 | — | No 33.2>27.6 | No 53.7>38.8 | No 52.0>27.6 |
| $[80 - 1.22 (CDBI_{50}) / (M_w/M_n)]$ | 63.26 | 27.96 | 35.93 | 45.28 | — | 57.90 | 53.76 | 61.28 |
| $68 [I_{21}/I_2]^{-1} + 10^{-6} (M_n)]$ | 2.89 | 8.3 | 7.8 | 3.79 | 4.98 | 5.55 | 4.61 | 4.23 |

TABLE 3

Film Properties

| Film No. | Inv. 1 | Comp. 1 | Comp. 2 | Comp. 3 | Comp. 4 |
|---|---|---|---|---|---|
| film gauge (mils) | 1 | — | 1 | 1 | 1 |
| dart impact (g/mil) | 638 | — | 650 | 473 | 317 |
| puncture strength (J/mm) | 53 | — | 71 | 63 | 57 |
| MD tear (g/mil) | 121 | — | 257 | 107 | 234 |
| TD tear (g/mil) | 455 | — | 405 | 448 | 629 |
| 1% MD secant modulus (Mpa) | 198 | — | 137 | 187 | 167 |
| 1% TD secant modulus (MPa) | 220 | — | 166 | 208 | 208 |
| MD tensile strength (MPa) | 51.0 | — | 56.6 | 49.9 | 51.6 |
| TD tensile strength (MPa) | 48.8 | — | 41.0 | 49.3 | 47.1 |
| MD yield strength (MPa) | 10.9 | — | 9.1 | 10.4 | 10.2 |
| TD yield strength (MPa) | 11.2 | — | 9.2 | 10.9 | 10.0 |
| MD ultimate elongation (%) | 477 | — | 571 | 476 | 469 |
| TD ultimate elongation (%) | 696 | — | 654 | 712 | 770 |
| gloss at 45? (%) | 50 | — | 68 | 60 | 72 |
| haze (%) | 11.2 | — | 7.2 | 7.7 | 5.2 |
| Sealability on 2.0 mil Films: | | | | | |
| seal initiation temp. (° C.) | 112 | — | 103 | 111 | 103 |
| max. cold seal strength (N) | 14.3 | — | 9.8 | 15.5 | 14.1 |
| temp. at max. seal strength (° C.) | 130 | — | 125 | 140 | 130 |
| Film Processing Parameters: | | | | | |
| Melt Temp (° C.) | 429 | — | 445 | 431 | 429 |
| Extruder Pressure (psi) | 3450-3495 | — | 4810-4855 | 3970-4015 | 4015-4055 |
| Current (amp) | 36 | — | 51 | 40 | 40 |
| Voltage (V) | 190 | — | 173 | 190 | 193 |
| spec. output (lb/hr/rpm) | 2.50 | — | 2.381 | 2.50 | 2.44 |
| Specific energy (w/lb/hr) | 68.4 | — | 88.2 | 76.0 | 77.2 |
| PPA additive (ppm) | 650 | — | ca. 250-300 | ca. 600 | — |

As shown in Table 2, the ethylene copolymer composition of the present Invention (inv. 1) has a melt flow ratio that is distinct from a resin prepared with (1,2-(n-propyl)($C_6F_5$)Cp)Ti(N=P(t-Bu)$_3$)Cl$_2$ (comp. 1) and from commercially available EXCEED 1018CA™ (comp. 2). The inventive resins (see inv. 1 but also inv. 2-8 discussed below) have a MFR of greater than 30, while the comparative resins 1 and 2 each have a melt flow ratio of less than 30. Further, the copolymer composition of the invention is distinct from an Enable 20-05 resin (comp. 3) which has a similar melt flow ratio (MFR of 41.2), but a very different TREF profile. The TREF profile of the inventive resins is multimodal (or trimodal with three prominent peaks separated by 5° C. or more), while the comp. resin 3 has a single peak evident in the TREF analysis. The inventive resin 1, as well as inv. resins 2-8, have a composition distribution breadth index $CDBI_{50}$ of less than 70 wt % while comp. resin 3 has a $CDBI_{50}$ of greater than 85%. Comparison of the inventive resin 1, with ELITE resins (comparative examples 5 and 6) shows that although each may have a multimodal TREF profile (note: that the Elite resin is a copolymer of ethylene and 1-octene, and the inventive resin is a copolymer of ethylene and 1-hexene), the inventive resin 1 has a broader molecular weight distribution (Mw/Mn of greater than 3.5) and a higher MFR ($I_{21}/I_2$ is greater than 32). The comparative resin 7, which is DOWLEX 2045G, and is made using a Ziegler-Natta catalyst, has a bimodal TREF profile and a MFR of less than 30.

When blown into film, inv. resin 1 has good dart impact values, good stiffness, and is easy to process as Indicated by the low shear thinning Index (SHI) and the high specific output rates.

As shown in Table 3, the dart impact of the inv. resin 1 is quite high at over 600 g/mil and is almost as good as a comp. resin 2, which has a much lower melt flow ratio ($I_{21}/I_2$). The inv. resin 1 also has a higher dart impact value than comparative resins of similar melt index and/or melt flow ratio: compare for example, comp. resin 3 (an Enable type resin) and comp. resin 4 (a melt blend of LLDPE and HPLDPE) which have dart impact values of 473 g/mil and 317 g/mil respectively with inventive resin 1, which has a dart impact value of 638 g/mil.

The stiffness of the inv. resin 1, as indicated by the 1% TD and MD secant modulus is higher relative to comparative resins 2, 3 or 4. As shown in Table 3, the inventive resin 1 has a 1% MD secant modulus of greater than 190 MPa when blown into a 1 mil film. Comparative resins 2, 3 and 4 have a 1% MD secant modulus of 137, 187, and 167 MPa respectively when blown into a 1 mil film. Inv. resin 1 has a 1% TD secant modulus of greater than 210 MPa when blown into a 1 mil film. Comparative resins 2, 3 and 4 have a 1% TD secant modulus of 166, 208 and 208 MPa respectively when blown into a 1 mil film.

In terms of processability, the inventive resin 1 extrudes with a higher specific output rate at lower head pressure than unblended comparative resin 2 which has a lower melt flow ratio (see Table 3). Inventive resin 1 has a similar specific output rate relative to comp. resin 3, but at lower extruder head pressure. Comp. resin 4 is a melt blend comprising a linear low density resin LLDPE and 5 wt % of high pressure low density polyethylene (HPLDPE) resin which is known to impart improved processability to a LLDPE due to the presence of long chain branching. Nevertheless, inventive resin 1 shows higher specific output even at lower extruder head pressure than comparative resin 4 (see Table 3).

Inventive Examples 2-8

In a series of further experiments: i) the amount of Armostat-1800 present in the catalyst system (in weight % based on the total weight of the polymerization catalyst system); ii) the organotransition metal catalyst loading on a silica support (in Ti mmol/gram of the polymerization catalyst system); and iii) the amount of catalyst activator, methylaluminoxane MAO (in weight % Al based on the total weight of the polymerization catalyst system) were changed to see how the catalyst system responded to changes in its formulation. The catalyst systems employed in inventive examples 2-8 were prepared substantially the same way and using the same phosphinimine catalyst as the catalyst system described in Inventive Example 1, except that the levels of Armostat-1800, organotransition metal (Ti loading) or catalyst activator (Al loading) were altered (see Table 4A). A total of seven further catalyst system formulations (Table 4A) were prepared and an ethylene copolymer of 1-hexene was prepared in a manner similar to that described above for Inventive Example 1 (See Table 4B for polymerization process conditions).

The catalyst system formulation data and polymerization data are given in Table 4A and Table 4B respectively and correspond to Inventive examples 2 through 8 (C2=ethylene; C6=1-hexene; N2=nitrogen; H2=hydrogen; C6/C2 is the molar feed ratio of these components to the reactor). Selected product parameters for the resulting ethylene copolymers (inventive ethylene copolymers 2-8) are provided in Table 5.

TABLE 4A

Catalyst System Formulations

| Invent. Example No. | Armostat-1800 (wt %) | $(1\text{-}C_6F_5CH_2\text{-}Indenyl)((t\text{-}Bu)_3P=N)TiCl_2$ (mmol Ti per g catalyst) | MAO (wt % Al) |
|---|---|---|---|
| 2 | 3.2 | 0.029 | 9.4% |
| 3 | 2.7 | 0.025 | 8.1% |
| 4 | 2.2 | 0.021 | 6.8% |
| 5 | 3.2 | 0.021 | 6.8% |
| 6 | 2.2 | 0.029 | 9.4% |
| 7 | 2.7 | 0.025 | 8.1% |
| 8 | 2.7 | 0.025 | 6.7% |

TABLE 4B

Polymerization Conditions

| Invent. Ex. No. | Prod Rate, kg/hr | Residence Time, hr | Rx Temp, °C. | C2 mol % | C6 mole % | N2 mole % | C6/C2 Molar Flow | H2/C2 Molar Flow |
|---|---|---|---|---|---|---|---|---|
| 2 | 2.45 | 1.8 | 80 | 66 | 1.2 | 33.4 | 0.021 | 0.0011 |
| 3 | 2.41 | 1.8 | 80 | 65 | 1.2 | 35.0 | 0.022 | 0.0011 |
| 4 | 1.82 | 2.5 | 80 | 65 | 1.4 | 35.1 | 0.023 | 0.0012 |
| 5 | 2.18 | 2.1 | 80 | 65 | 1.3 | 35.3 | 0.022 | 0.0012 |
| 6 | 2.35 | 2.0 | 80 | 66 | 1.2 | 34.6 | 0.022 | 0.0011 |
| 7 | 2.11 | 2.1 | 80 | 65 | 1.2 | 35.8 | 0.022 | 0.0012 |
| 8 | 2.15 | 2.2 | 80 | similar to above | | | 0.022 | 0.0012 |

TABLE 5

Copolymer Properties

| Inv. Ex. No. | 2 | 3 | 4 | 5 | 6 | 7 | 8 |
|---|---|---|---|---|---|---|---|
| Copolymer No. | Inv. 2 | Inv. 3 | Inv. 4 | Inv. 5 | Inv. 6 | Inv. 7 | Inv. 8 |
| density (g/cc) | 0.9204 | 0.9208 | 0.9211 | 0.9215 | 0.9206 | 0.9212 | 0.9216 |
| MI, $I_2$ (g/10 min) | 0.67 | 0.62 | 0.78 | 0.68 | 0.63 | 0.71 | 0.72 |
| MFR, $I_{21}/I_2$ | 39.2 | 40.5 | 40.8 | 41.2 | 37.1 | 41.1 | 40.6 |
| $I_{10}/I_2$ | 10.0 | 10.3 | 10.3 | 10.6 | 10.3 | 10.4 | 10.4 |
| TREF profile, ° C. | trimodal | trimodal | trimodal | trimodal | trimodal | trimodal | trimodal |
| | T(low) = 70.4 | T(low) = 70.6 | T(low) = 68.0 | T(low) = 69.3 | T(low) = 70.8 | T(low) = 69.7 | T(low) = 69.1 |
| | T(med) = 82.1 | T(med) = 81.6 | T(med) = 82.1 | T(med) = 81.8 | T(med) = 81.4 | T(med) = 81.8 | T(med) = 83.6 |
| | T(high) = 93.6 | T(high) = 93.6 | T(high) = 93.4 | T(high) = 93.5 | T(high) = 93.3 | T(high) = 93.4 | T(high) = 93.3 |
| T(med)-T(low), ° C. | 11.7 | 11.0 | 14.1 | 12.5 | 10.6 | 12.1 | 14.5 |
| T(high)-T(med), ° C. | 11.5 | 12.0 | 11.3 | 11.7 | 11.9 | 11.6 | 9.7 |
| T(high)-T(low), ° C. | 23.2 | 23.3 | 25.4 | 24.2 | 22.5 | 23.7 | 24.2 |
| wt % at 90-105° C. | 18.1 | 18.6 | 16.9 | 18.8 | 19.3 | 17.5 | 20.1 |
| wt % at >100° C. | 0 | 0 | 0.85 | 0 | 0 | 0.14 | 0.03 |
| T(75)-T(25) (° C.) | 19.21 | 18.64 | 19.77 | 19.06 | — | — | — |
| $CDBI_{50}$ (wt %) | 52.4 | 53.7 | 52.7 | 52.7 | 50.4 | 53.7 | 47.3 |
| comonomer profile | reverse | reverse | reverse | reverse | reverse | reverse | reverse |
| DSC melt temp (° C.) | 107.7, 121.7 | 108.2, 121.4 | 108.3, 121.2 | 106.2, 121.4 | 109.4, 121.4 | 106.7, 121.1 | 108.7, 121.6 |
| % crystallinity | 44.1 | 45.9 | 46.4 | 46.3 | 45.6 | 46.5 | 46.5 |
| CY a-parameter | 0.1832 | 0.1823 | 0.1814 | 0.1706 | — | — | — |

TABLE 5-continued

Copolymer Properties

| Inv. Ex. No. | 2 | 3 | 4 | 5 | 6 | 7 | 8 |
|---|---|---|---|---|---|---|---|
| $M_w$ | 108738 | 109688 | 96771 | 113303 | 104054 | 107510 | 107736 |
| $M_n$ | 25484 | 24768 | 19835 | 20619 | 23148 | 23719 | 21641 |
| $M_z$ | 307791 | 305388 | 265065 | 383405 | 296306 | 313382 | 321028 |
| $M_w/M_n$ | 4.27 | 4.43 | 4.88 | 4.91 | 4.50 | 4.53 | 4.98 |
| $M_z/M_w$ | 2.83 | 2.78 | 2.74 | 3.38 | 2.85 | 2.92 | 2.98 |
| $C_6$ content (wt %) | 7.3 | 7.1 | 7.3 | 7.1 | 7.3 | 7.3 | 7.2 |
| SCB/1000 C. | 12.7 | 12.5 | 12.8 | 12.4 | 12.8 | 12.8 | 12.6 |
| hexane extractables (%) | 0.84 | 0.82 | 1.03 | 0.93 | 0.75 | 0.81 | 0.85 |
| melt strength (cN) | 5.92 | 6.17 | 5.58 | 5.90 | 6.12 | 5.45 | 5.53 |
| processability enhancement index ($\chi$) | 1.06 | 1.07 | 1.08 | 1.05 | 1.08 | 1.06 | 1.04 |
| VGP crossover phase angle ($\delta^{XO}$) | 61.1 | 60.3 | 60.9 | 59.5 | 61.1 | 60.8 | 61.6 |
| $96 - 2.14\,[(MFR^{0.5}) + 1 \times 10^{-4}\,(M_w - M_n)]$ | 64.8 | 64.2 | 65.9 | 62.4 | 65.7 | 64.4 | 63.9 |
| SCB/1000 C. at MW of 200,000 − SCB/1000 C. at MW of 50,000 | 7.97 | 7.39 | 6.86 | 8.39 | 8.06 | 8.10 | 8.30 |
| Shear Thinning Index (SHI) | 0.21 | 0.20 | 0.21 | 0.16 | — | — | — |
| $(CDBI_{50} - 3) \leq [15/(a + 0.12)]$ | Yes 49.4 < 49.5 | No 50.7 < 49.6 | Yes 49.7 < 49.8 | Yes 49.7 < 51.6 | — | — | — |
| $[80-1.22\,(CDBI_{50})/(M_w/M_n)]$ | 65.03 | 65.21 | 66.83 | 66.91 | 66.34 | 65.54 | 68.41 |
| $68\,[(I_{21}/I_2)^{-1} + 10^{-6}\,(M_n)]$ | 3.47 | 3.36 | 3.02 | 3.22 | 3.41 | 3.27 | 3.15 |

Figure 2:
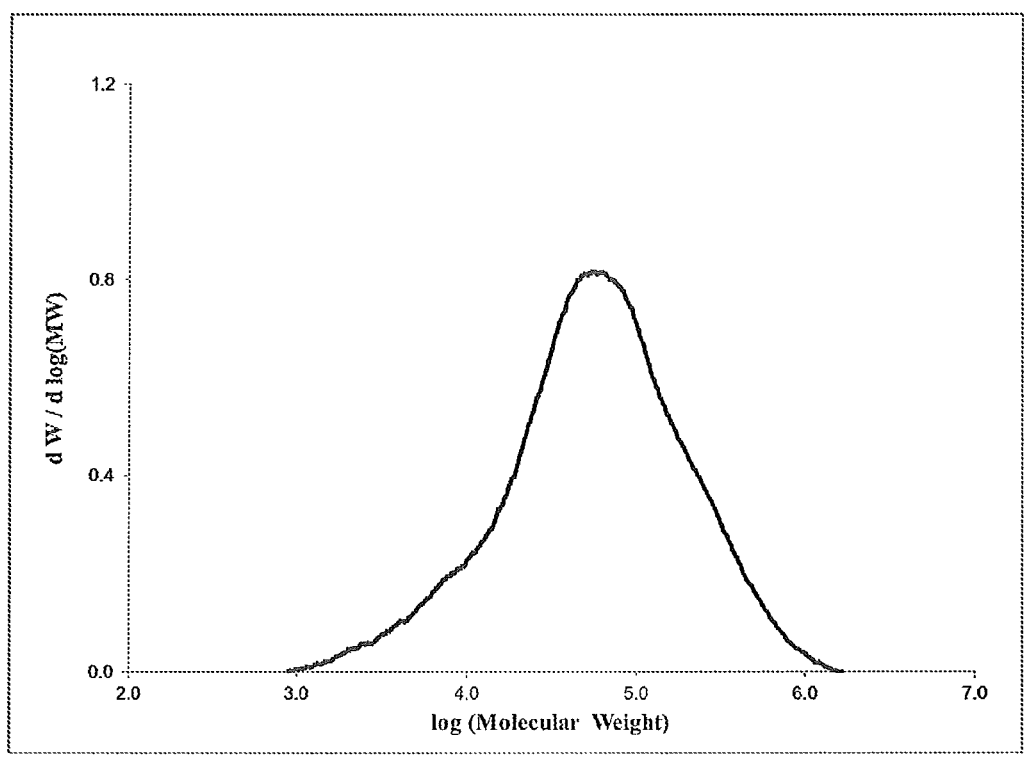
FIG. 2 shows a gel permeation chromatograph (GPC) with refractive index detection, of an ethylene copolymer made according to the present invention.

As can be seen in Tables 2 and 5, all the inventive resins 1-8 have a reverse comonomer distribution, a multimodal (e.g. trimodal) TREF profile, a $CDBI_{50}$ within a range of from 40 to 70 wt %, an MFR within a range of 32 to 50, a $M_w/M_n$ within a range of from 3.5 to 6.0 and a fractional melt index ($I_2$ of less than 1.0). Each of the inventive resins 1-8 shown in Tables 2 and 5 also have a broad unimodal molecular weight distribution (see FIG. 2 as representative of the inventive ethylene copolymers).

Figure 3:
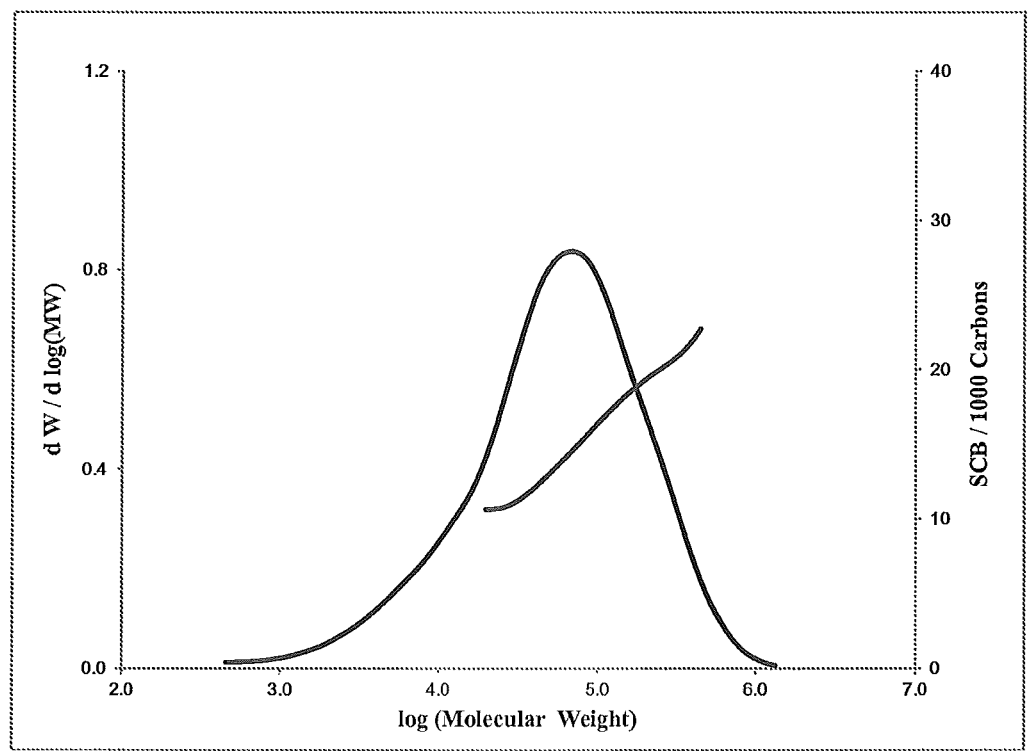
FIG. 3 shows a gel permeation chromatograph with Fourier transform infra-red (GPC-FTIR) detection obtained for an ethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".

A representative TREF curve is shown in FIG. 1 for Inventive resin 1. A representative GPC curve is shown for Inventive resin 1 in FIG. 2. A representative GPC-FTIR curve is shown for Inventive resin 1 in FIG. 3.

The good processability of the inventive copolymers is also manifest in a model of polymer architecture which is based on van Gurp-Palmen (VGP) melt rheology behavior as determined by dynamic mechanical analysis (DMA), gel permeation chromatography (GPC) refractive Index (RI) data and melt flow ratio ($I_{21}/I_2$) information. The model is a polymer processability model, and provides a polymer "processability enhancement index" ($\chi$) which may be usefully applied to distinguish resins having relatively low and relatively high processability.

A van Gurp-Palmen analysis is a means by which to study a polymer architecture (e.g. molecular weight distribution, linearity, etc.) as reflected by the polymer melt morphology. A VGP curve is simply a plot of the phase angle ($\delta$) versus complex modulus ($G^*$), where the two rheology parameters are obtained using the frequency sweep test in dynamic mechanical analysis (DMA). The processability model accounts for the effects of resin architecture on VGP parameters such as complex modulus ($G^*$) and phase angle ($\delta$). A shift of a VGP curve from a baseline curve or a decrease in the phase angles at the mid-range of complex modulus may indicate changes in the polymer melt morphology.

The present processablity model further requires the determination of a VGP crossover rheology parameter which is defined as the intersecting point obtained between the phase angle ($\delta$) vs. complex modulus ($G^*$) plot and a phase angle ($\delta$) vs. complex viscosity ($\eta^*$) plot. Based on a linear viscoelasticity theory, the VGP crossover rheology parameter ($\delta^{XO}$) occurs at a frequency ($\omega$) which is equal to unity. It is the phase angle at which the $G^*$ and the $\eta^*$ are equivalent. Hence the VGP crossover rheology parameter can be determined in a single DMA test.

Figure 4A:
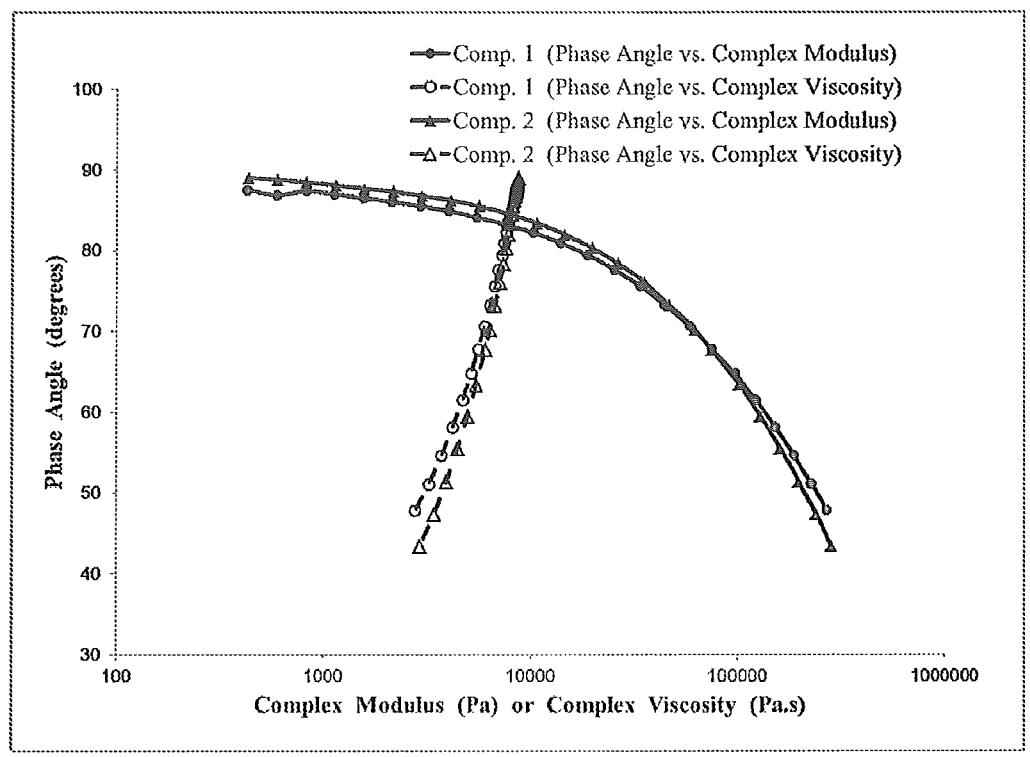
FIG. 4A show plots of the phase angle vs the complex modulus and the phase angle vs complex viscosity for comparative ethylene copolymer resins no. 1 and 2 as determined by dynamic mechanical analysis (DMA).
Figure 4B:
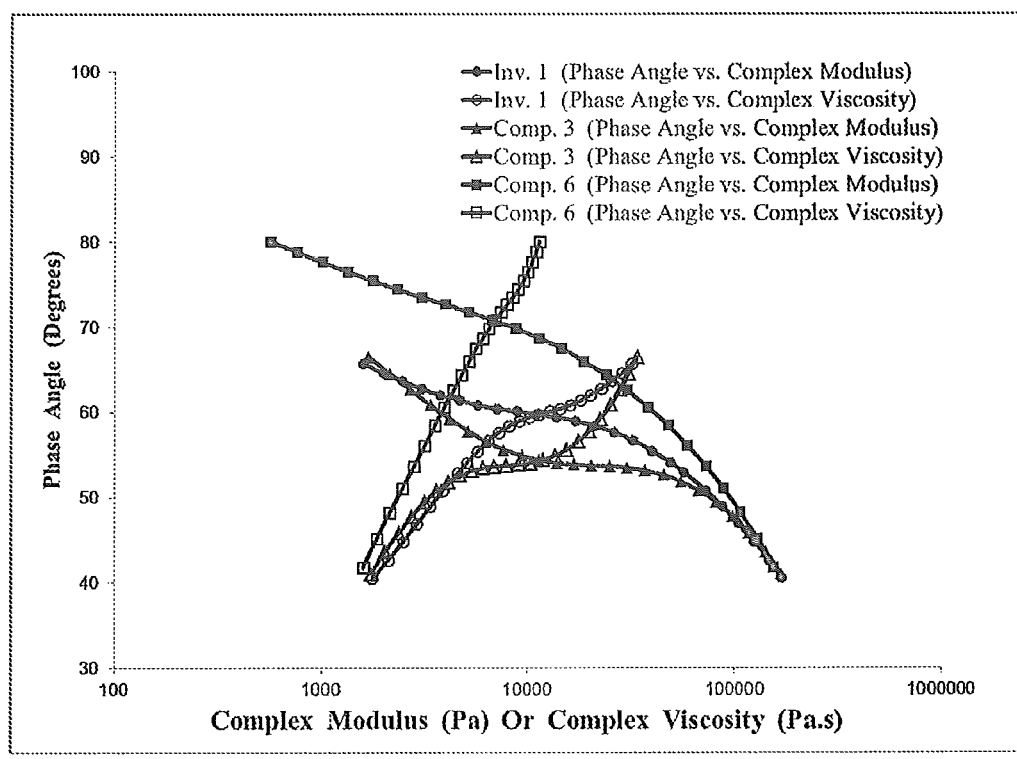
FIG. 4B show plots of the phase angle vs the complex modulus and the phase angle vs complex viscosity for inventive ethylene copolymer no. 1 and for comparative ethylene copolymers no. 3 and 6, as determined by DMA.

The VGP crossover plots for resins sold under the tradenames Exceed 1018 (Comp. 2) and Enable (Comp. 3) are included in FIGS. 4A and 4B respectively. The VGP crossover plots for the Inventive resin 1 is shown in FIG. 4B. The VGP crossover plots for comparative resin 1, made according to comparative example 1, are included in FIG. 4A. Finally, the resin sold under the trade name Elite 5400G (Comp. 6) is included in FIG. 4B. The VGP crossover points are dependent upon the copolymer architecture. Generally, for resins which are easier to process such as inventive copolymer 1 and comparative resin 3, the VGP phase angle at which crossover occurs defined as $\delta^{XO}$ is lower than for resins which are more difficult to process such as comparative copolymers 1 and 2 (compare FIGS. 4A and 4B). For resins that are easier to process, the shape of the phase angle-complex viscosity curves and the shape of the phase-angle complex modulus curves, are deflected somewhat and more closely resemble mirror images of each other, relative to the curves obtained for resins which are more difficult to process (compare the curves in FIG. 4A with the curves in FIG. 4B).

The crossover complex modulus ($G^{*XO}$) (or alternatively the crossover complex viscosity, $\eta^{*XO}$) was found to relate to melt index, $I_2$ in the following way:

$$G^{*XO} = 6798.3\,(I_2)^{-0.9250} \quad (1)$$

Hence, a polymer with a higher molecular weight would have a greater crossover complex modulus. The relationship in equation 1 was found to hold regardless of the polymer density or molecular weight distribution.

The VGP crossover phase angle $\delta^{XO}$ will be a function of several resin parameters. The polymer density was found to have a limited effect on the crossover phase angle, independent of other polymer architectural (or microstructural)

effects. The molecular weight distribution ($M_w/M_n$) was found to have an effect on the VGP crossover phase angle.

The crossover phase angle and crossover complex modulus plot shows that resins having good processability and poor processability can be differentiated fairly well by imposing a constraint on the two VGP crossover parameters. Accordingly, resins which are relatively easy to process will satisfy inequality (2):

$$\delta^{XO} \leq 76.6 - 9 \times 10^4 (G^{*XO}). \quad (2)$$

In order to remove the effects of molecular weight distribution ($M_w/M_n$) and weight average molecular weight ($M_w$) on the $\delta^{XO}$ and hence to determine polymer architectural (or microstructural) effects on processability, these effects must be decoupled from the determination of $\delta^{XO}$ to allow the ranking of resins of different $M_w/M_n$ and $M_w$ on the same semi-qualitative scale. For a semi-qualitative measurement of polymer architectural (or microstructural) effects, one has to design experiments to decouple the molecular weight and molecular weight distribution effects on the melt rheology parameters.

A composite structural constraint of the $\delta^{XO}$ is derived in order to separate resin into two groups according to their melt rheology behavior. By expressing $\Omega^{XO}$ as a function of melt flow ratio ($I_{21}/I_2$), and number average ($M_n$) and weight average ($M_w$) molecular weights according to the inequality (3), the inventive and comparative resins are again separated into two groups having different relative processability:

$$\delta^{XO} \leq 96 - 2.14[(MFR^{0.5}) + 1 \times 10^{-4}(M_w - M_n)]. \quad (3)$$

Figure 5:
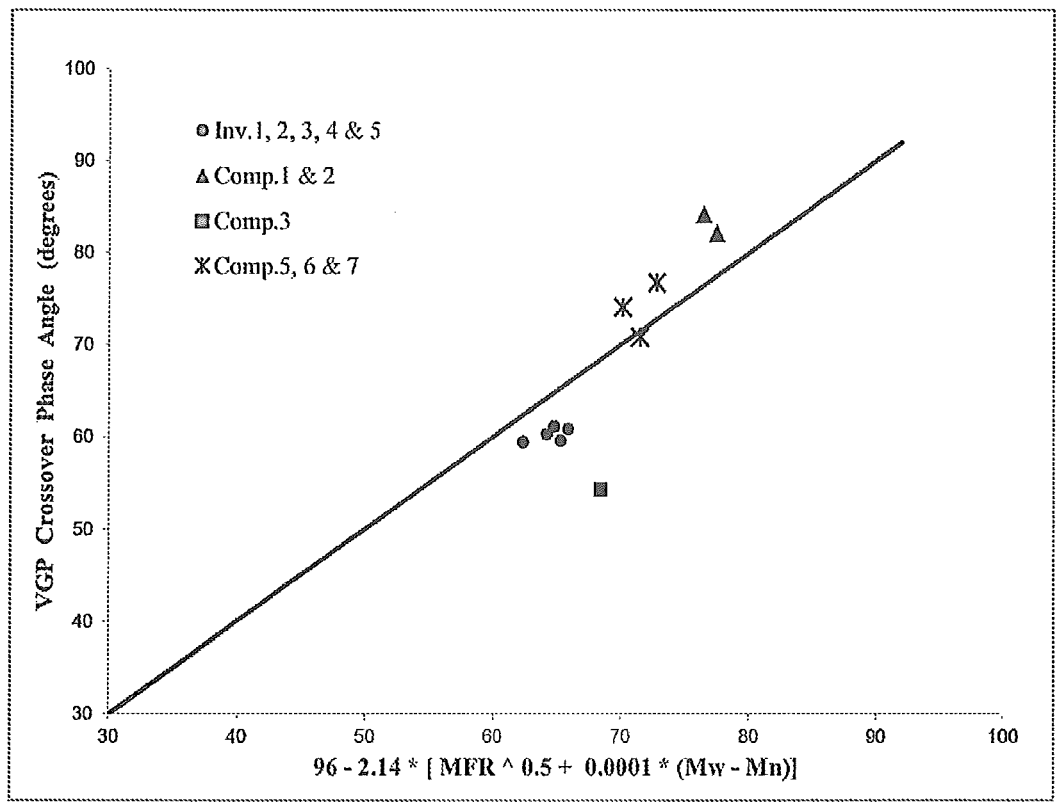
FIG. 5 shows a plot of the equation: $\delta^{XO}=96-2.14 [(MFR^{0.5})+1\times10^{-4} (M_w-M_n)]$. The value obtained from the equation $96-2.14 [(MFR^{0.5})+1\times10^{-4} (M_w-M_n)]$ (the x-axis) is plotted against the corresponding van Gurp-Palmen crossover phase angle, $\delta^{XO}$ (the y-axis) for inventive resin Nos. 1-5 and comparative resin Nos. 1-3 and 5-7.

FIG. 5 shows a plot of the line for equation: $\delta^{XO} = 96 - 2.14 [(MFR^{0.5}) + 1 \times 10^{-4} (M_w - M_n)]$ as well as plotted data corresponding to the VGP crossover phase angle ($\delta^{XO}$) and $96 - 2.14 [(MFR^{0.5}) + 1 \times 10^{-4} (M_w - M_n)]$ values for inventive resins 1-5 and comparative resins 1-3 and 5-7.

Inequality (3) allows the decoupling of molecular weight and molecular weight distribution effects on $\delta^{XO}$ by including melt flow data and GPC data. As a result, resins of divergent molecular weight and molecular weight distribution can be ranked against one another using only melt flow, DMA and GPC data.

The crossover phase angle $\delta^{XO}$ generally follows a liner relationship with a composite function of the melt flow ratio and molecular weights for linear ethylene-a-olefin copolymers. Thus, without wishing to be bound by theory, any changes to the VGP crossover phase angle measured by DMA is herein attributed to other aspects of the polymer architecture affecting the melt rheology. The relative effect of such aspects of architecture (or microstructure) on the $\delta^{XO}$ value is manifest in a greater negative deviation from the baseline defined by inequality (3). Hence, inequality (3) allows one to rank ethylene copolymers according to undefined architectural or microstructural effects on the crossover phase angle, where those architectural/microstructural effects do not include molecular weight or molecular weight distribution.

The degree to which the VGP phase angle $\delta^{XO}$ is different for resins which are easier to process, may be assessed by using a processability enhancement index ($\chi$). According to the present model, the processability enhancement index is defined in a semi-quantitative manner in the following equation 4:

$$\chi = 96 - 2.14[(MFR^{0.5}) + 1 \times 10^{-4}(M_w - M_n)] / \delta^{XO}. \quad (4)$$

The $\chi$ values are close to or greater than unity for polymers showing significant processability enhancement from polymer architectural/microstructural affects and less than unity for polymers showing no or little processability enhancement from polymer architectural/microstructural affects (e.g. less than about 0.97). As the data in Tables 2 and 5 show, inventive resins 1-8, as well as comparative resins 3 and 6, each have a processability enhancement index $\chi$ of greater than 1.0, while comparative resins 1, 2, 5 and 7 have a processability enhancement index $\chi$ of less than 1.0. This is fully consistent with the higher output rates and lower currents and pressures associated with blowing film from inventive resin 1 and comparative resin 3 relative to comparative resins 1 and 2 (see Table 3). Hence in terms of processability, inventive resin 1, as well as comparative resin 3, are similar and better than comparative resins 1 and 2.

In addition to the above, and as shown in Tables 2 and 5, is the fact that the inventive ethylene copolymers 1-8 satisfy the following relationships:

$$(M_w/M_n) \geq 68[(I_{21}/I_2)^{-1} + 10^{-6}(M_n)]; \text{ and} \quad (i)$$

$$\delta^{XO} \leq [80 - 1.22(CDBI_{50})/(M_w/M_n)]; \quad (ii)$$

where $\delta^{XO}$ is the crossover phase angle, $M_w$, $M_n$, $I_{21}$, $I_2$ and $CDBI_{50}$ are all as defined as above. The data provided in Table 2, further shows that none of the comparative resins 1-7 satisfy either of the conditions: (i) $(M_w/M_n) \geq 68 [(I_{21}/I_2)^{-1} + 10^{-6}(M_n)]$ or (ii) $\delta^{XO} \leq [80 - 1.22 (CDBI_{50})/(M_w/M_n)]$.

Figure 6:
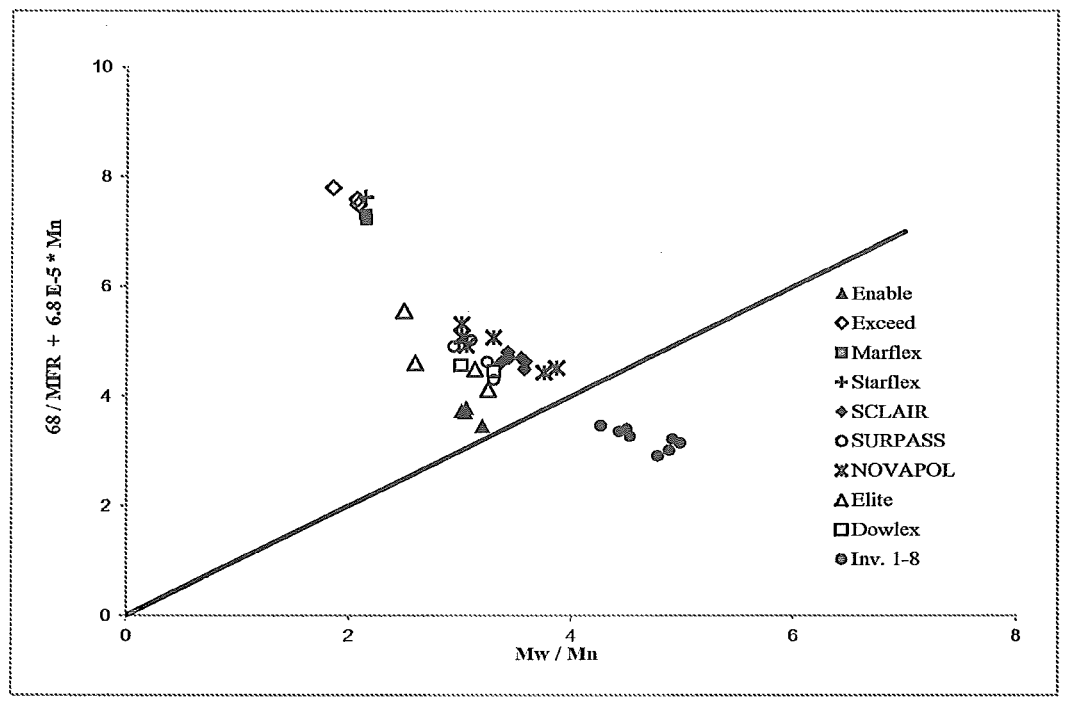
FIG. 6 shows a plot of the equation: $Mw/Mn=68 [(I_{21}/I_2)^{-1}+10^{-6} (M_n)]$. The values from the equation $68 [(I_{21}/I_2)^{-1}+10^{-6} (M_n)]$(the y-axis) are plotted against the corresponding Mw/Mn values (the x-axis) for resins 1-8 as well as for several commercially available resins which have a melt index of 1.5 or less and a density of between 0.916 and 0.930 g/cm³.

For further comparison purposes, inventive ethylene copolymers 1-8 have been plotted against several known commercial resins in FIG. 6. FIG. 6 shows a plot of the equation: $(M_w/M_n) = 68 [(I_{21}/I_2)^{-1} + 10^{-6}(Mn)]$, as well as a plot of the Mw/Mn vs. $68 [(I_{21}/I_2)^{-1} + 10^{-6}(M_n)]$ values for inv. resins 1-8 and several known commercial resins. The commercial resins included in FIG. 6 for comparison purposes are all resins having an MI of 1.5 or less and a density of between 0.916 and 0.930 g/cm³ and which are sold under trade names such as, Elite™, Exceed™, Marflex™, Starflex™, Dowlex™, SURPASS™, SCLAIR™, NOVAPOL™ and Enable™. As can be seen from FIG. 6, none of these commercial grades satisfy the condition: $(M_w/M_n) \geq 68 [(I_{21}/I_2)^{-1} + 10^{-6}(M_n)]$. In contrast all of the inv. resins 1-8 satisfy the condition: $(M_w/M_n) \geq 68 [(I_{21}/I_2)^{-1} + 10^{-6}(M_n)]$. This work demonstrates the distinct architecture of the inventive ethylene copolymers.

Figure 7:
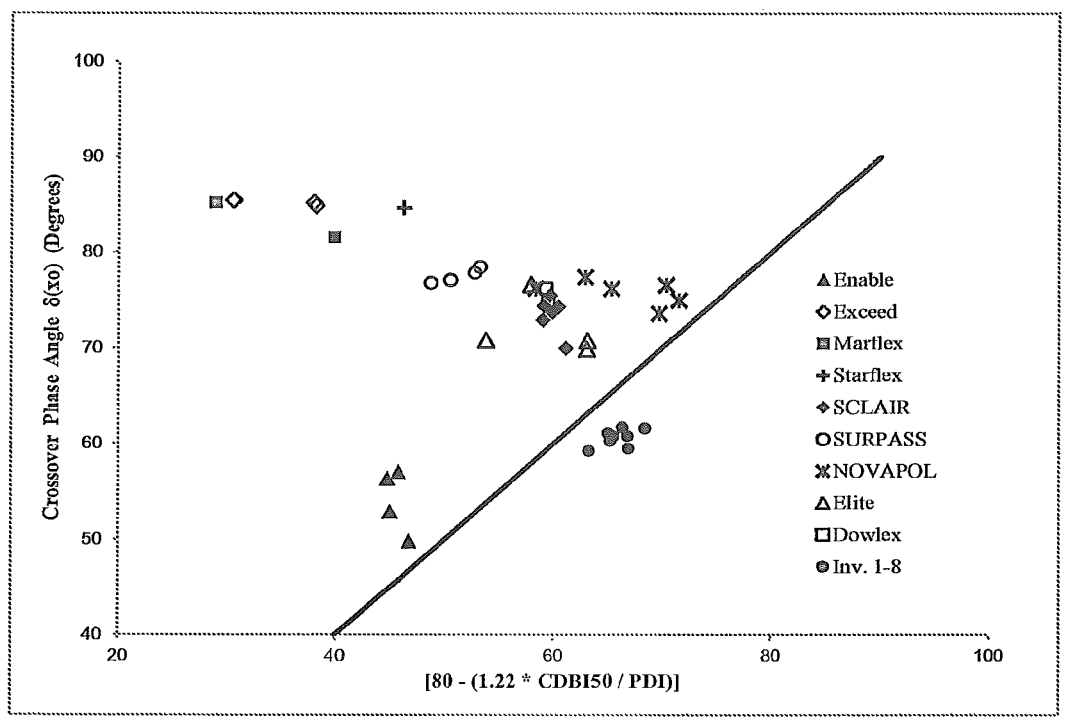
FIG. 7 shows a plot of the equation: $\delta^{XO}=[80-1.22 (CDBI_{50}/(M_w/M_n)]$. The values of the equation $[80-1.22 (CDBI_{50}/(M_w/M_n)]$ (the x-axis) are plotted against the corresponding crossover phase angle ($\delta^{XO}$) values (the y-axis) for resins 1-8 as well as for several commercially available resins which have a melt index of 1.5 or less and a density of between 0.916 and 0.930 g/cm³.

For further comparison purposes, inventive ethylene copolymers 1-8 have been plotted against several known commercial resins in FIG. 7. FIG. 7 shows a plot of the equation: $\delta^{XO} = [80 - 1.22 (CDBI_{50})/(M_w/M_n)]$, as well as a plot of the $\delta^{XO}$ vs. $[80 - 1.22 (CDBI_{50})/(M_w/M_n)]$ values for inv. resins 1-8 and several known commercial resins. The commercial resins included in FIG. 7 for comparison purposes are all resins having an MI of 1.5 or less and a density of between 0.916 and 0.930 g/cm³ and which are sold under trade names such as, Elite™, Exceed™, Marflex™, Starflex™, Dowlex™, SURPASS™, SCLAIR™, NOVAPOL™ and Enable™. As can be seen from the figure, none of these commercial grades satisfy the condition: $\delta^{XO} \leq [80 - 1.22 (CDBI_{50})/(M_w/M_n)]$. In contrast, all of the inv. resins 1-8 satisfy the condition: $\delta^{XO} \leq [80 - 1.22 (CDBI_{50})/(M_w/M_n)]$. This work further demonstrates the distinct architecture of the inventive ethylene copolymers.

What is claimed is:

1. A film layer having a dart impact of greater than 500 g/mil, a 1% MD secant modulus of greater than 150 MPa, a 1% TD secant modulus of greater than 175 MPa and a ratio of MD tear to TD of 0.75 or less; wherein the film layer comprises an ethylene copolymer having a density of from 0.916 g/cc to 0.930 g/cc, a melt index ($I_2$) of from 0.1 g/10 min to 1.0 g/10 min, a melt flow ratio ($I_{21}/I_2$) of from 32 to 50, a molecular weight distribution ($M_w/M_n$) of from 3.6 to 6.5, a reverse comonomer distribution profile as determined by GPC-FTIR, a multimodal TREF profile, and a composition distribution breadth index $CDBI_{50}$ of from 35 wt % to 70 wt % as determined by TREF; and wherein the ethylene copolymer is made by a process for polymerizing ethylene and an alpha olefin having 3-8 carbon atoms in a single reactor in the presence of a polymerization catalyst system comprising a single transition metal catalyst, a support, and a catalyst activator; and wherein the single transition metal catalyst is a group 4 phosphinimine catalyst.

2. The film layer of claim 1 wherein the ratio of MD tear to TD tear is from 0.2 to 0.6.

3. The film layer of claim 1 wherein the ratio of MD tear to TD tear is 0.45 or less.

4. The film layer of claim 1 wherein the ethylene copolymer has a density of from 0.917 g/cc to 0.927 g/cc.

5. The film layer of claim 1 wherein the polymerization catalyst system further comprises a catalyst modifier.

6. A film layer having a dart impact of greater than 500 g/mil, a 1% MD secant modulus of greater than 150 MPa, a 1% TD secant modulus of greater than 175 MPa and a ratio of MD tear to TD of 0.75 or less; wherein the film layer comprises an ethylene copolymer which is not a blend, having a density of from 0.916 g/cc to 0.930 g/cc, a melt index ($I_2$) of from 0.2 g/10 min to 0.85 g/10 min, a melt flow ratio ($I_{21}/I_2$) of from 36 to 50, a molecular weight distribution ($M_w/M_n$) of from 4.0 to 6.0, a Z-average molecular weight distribution ($M_z/M_w$) of from 2.0 to 4.0, a reverse comonomer distribution profile as determined by GPC-FTIR, a multimodal TREF profile comprising three intensity peaks occurring at elution temperatures T(low), T(med) and T(high), where T(low) is from 62° C. to 82° C., T(med) is from 76° C. to 89° C. but higher than T(low), and T(high) is from 90° C. to 100° C., and a composition distribution breadth index $CDBI_{50}$ of from 35 wt % to 70 wt % as determined by TREF.

7. The film layer of claim 6 wherein the ethylene copolymer has a density of from 0.917 g/cc to 0.927 g/cc.

* * * * *